United States Patent
Kumaki

(10) Patent No.: US 7,627,237 B2
(45) Date of Patent: Dec. 1, 2009

(54) IMAGE PROCESSING APPARATUS AND METHOD AND PROGRAM

(75) Inventor: Jinyo Kumaki, Tokyo (JP)

(73) Assignee: Sony Corporation, Tokyo (JP)

( * ) Notice: Subject to any disclaimer, the term of this patent is extended or adjusted under 35 U.S.C. 154(b) by 615 days.

(21) Appl. No.: 11/417,243

(22) Filed: May 4, 2006

(65) Prior Publication Data

US 2006/0262193 A1   Nov. 23, 2006

(30) Foreign Application Priority Data

May 16, 2005  (JP)  ............................ P2005-143083

(51) Int. Cl.
*G03B 17/00*  (2006.01)
*H04N 5/228*  (2006.01)

(52) U.S. Cl. .................................... 396/55; 348/208.99

(58) Field of Classification Search ................... 396/55; 348/208.1, 208.5, 208.6, 208.9, 208.99
See application file for complete search history.

(56) References Cited

U.S. PATENT DOCUMENTS

| | | | |
|---|---|---|---|
| 5,502,484 A | 3/1996 | Okada | |
| 5,867,213 A | 2/1999 | Ouchi | |
| 6,236,431 B1 * | 5/2001 | Hirasawa et al. | 348/240.99 |
| 6,263,162 B1 * | 7/2001 | Yamazaki et al. | 396/55 |
| 2002/0063779 A1 | 5/2002 | Kaneda et al. | |
| 2005/0062852 A1 | 3/2005 | Yamazaki | |

FOREIGN PATENT DOCUMENTS

JP  2004-266322   9/2004

OTHER PUBLICATIONS

EPO Search Report mailed on Aug. 17, 2006.

\* cited by examiner

*Primary Examiner*—Rodney E Fuller
(74) *Attorney, Agent, or Firm*—Rader, Fishman & Grauer PLLC

(57) ABSTRACT

An image processing apparatus includes an image pickup unit picking up an image with an image pickup device, a vibration amount output unit detecting vibration and outputting a vibration amount indicating a size of the vibration, a calculation unit calculating a first correction amount for reducing influence of the vibration to the image from the vibration amount output by the vibration amount output unit, a determination unit determining whether a zoom magnification ratio at a time that the image is picked up by the image pickup unit is equal to or higher than a predetermined threshold, a generation unit generating a second correction amount based on the first correction amount when the zoom magnification ratio is equal to or higher than the threshold value by the determination unit and a correction unit correcting the image picked up by the image pickup unit based on the first or second correction amount.

16 Claims, 16 Drawing Sheets

IMAGE PROCESSING APPARATUS AND METHOD AND PROGRAM

CROSS REFERENCES TO RELATED APPLICATIONS

The present invention contains subject matter related to Japanese Patent Application JP 2005-143083 filed in the Japanese Patent Office on May 16, 2005, the entire contents of which being incorporated herein by reference.

BACKGROUND OF THE INVENTION

1. Field of the Invention

The present invention relates to an image processing apparatus, method, and program and more particularly, to an image processing apparatus, method and program capable of reducing influence of vibration to an image when the image is picked up by a portable image pickup apparatus.

2. Description of the Related Art

Portable video cameras and digital still cameras have been widely used. In the following description, the video camera will be described as an example. As an example of an object image pickup device used for the video camera, there are charge transfer type object image pickup devices such as a CCD (charge coupled device) sensor and X-Y address type object image pickup device such as a CMOS (complementary metal oxide semiconductor) sensor.

The CMOS sensor has low power consumption and is driven with a single low voltage in comparison with the CCD sensor and driver. In addition, since the CMOS sensor can be easily integrated with peripheral circuits, the CMOS sensor is used for the image processing apparatus such as a video camera.

However, it is difficult to record a high quality moving or still image by using the CMOS sensor as the image pickup device of the image processing apparatus such as a video camera. One of the reasons is that deformation of the picked-up image caused by hand shake occurs. In case of the CCD senor which has been used as an image pickup device of the image processing apparatus, a correction amount required for performing a process for reducing influence of the hand shake is a single value which is calculated based on hand shake information obtained in one field or one frame. In this case, exposure time intervals of all the pixels are equal to each other, and deformation of image does not occur, so that the hand shake can be corrected by using the single value.

In case of the CMOS sensor, an image of an object is picked up by using the following mechanisms, deformation of image caused by the hand shake occurs. The deformation is considered to occur as follows.

In the charge transfer type solid-state image pickup device such as a CCD senor, all the pixels can be exposure at the same time to allow pixel data to be read out. However, in the X-Y address type solid-state image pickup device such as a CMOS sensor, the pixel data are sequentially read out in units of one pixel or one line. In a case where the pixel data are sequentially read out in units of one line, if one image is constructed with 1 to N lines, and if a time of t seconds is taken to read out one line, a time of N×t seconds is taken to read out data of one image.

In other words, from a time that a first line is read out, after a time of about N×t seconds elapses, an N-th line is read out. Due to such a time delay, if vibration such as hand shake is exerted at a time that an image is picked up (when the image data are read out line-by-line), image positions in the first line and the n-th line deviate, so that deformation of the picked-up image may occur.

In order to reduce the deformation of image, a technique for performing vibration removing correction at a time that the vibration such as hand shake is, exerted has been proposed (see Patent Document 1). Patent Document 1: Japanese Unexamined Patent Application Publication No. 2004-266322

In addition to the hand shake correction, other processes are also performed in the image processing apparatus such as video camera. Recently, due to increase in the number of pixels and a high accuracy of the video camera, data amount and processed amount thereof increase greatly. For the reason, a required memory capacity increases, so that a processing performance intends to be improved.

Particularly, unlike a still image, it is important to process a moving image in real time. Therefore, in case of the moving picture, a larger memory capacity is required, and a highly-accurate processing performance is required. If a size of signal processes increase greatly, costs and power consumption increase greatly. However, low cost and power consumption is preferable in terms of increase in a driving time. Therefore, it is necessary to reduce costs and power consumption and to efficiently treat a process influencing with the reduction thereof.

The present invention is to efficiently perform a process and reduce costs or power consumption.

SUMMARY OF THE INVENTION

According to a first aspect of the invention, there is provided an image processing apparatus comprising: an image pickup unit picking up an image with an image pickup device; a vibration amount output unit detecting exerted vibration and outputting a vibration amount indicating a size of the vibration; a calculation unit calculating a first correction amount for reducing influence of the vibration to the image from the vibration amount output by the vibration amount output unit; a determination unit determining whether or not a zoom magnification ratio at a time that the image is picked up by the image pickup unit is higher than a predetermined threshold; a generation unit generating a second correction amount based on the first correction amount when the zoom magnification ratio is determined to be higher than the threshold value by the determination unit; and a correction unit correcting the image picked up by the image pickup unit based on the first correction amount or the second correction amount.

In the aforementioned aspect of the present invention, the generation unit may set a coefficient corresponding to the zoon magnification ratio and generate the second correction amount by multiplying the first correction amount with the coefficient.

In addition, the calculation unit may calculate a plurality of the first correction amounts from the image, and the generation unit may set the coefficient for the first correction amounts excluding at least one first correction amount among a plurality of the first correction amounts.

In addition, the coefficient may have a value of from 0 to 1.

In addition, the determination unit may set the coefficient to 0 when the zoom magnification ratio is higher than a second threshold value which is larger than the predetermined threshold value.

According to the first aspect of the invention, there is provided an image processing method comprising: an image pickup step of picking up an image by controlling an image pickup device; a vibration amount output step of detecting exerted vibration and outputting a vibration amount indicating a size of the vibration; a calculation step of calculating a first correction amount for reducing influence of the vibration to the image from the vibration amount output in the vibration amount output step; a determination step of determining whether or not a zoom magnification, ratio at a time that the image is picked up in the image pickup step is higher than a predetermined threshold; a generation step of generating a second correction amount based on the first correction amount when the zoom magnification ratio is determined to be higher than the threshold value in the determination step; and a correction step of correcting the image picked up in the image pickup step based on the first correction amount or the second correction amount.

According to the first aspect of the invention, there is provided a computer readable program comprising: an image pickup step of picking up an image by controlling an image pickup device; a vibration amount output step of detecting exerted vibration and outputting a vibration amount indicating a size of the vibration; a calculation step of calculating a first correction amount for reducing influence of the vibration to the image from the vibration amount output in the vibration amount output step; a determination step of determining whether or not a zoom magnification ratio at a time that the image is picked up in the image pickup step is higher than a predetermined threshold; a generation step of generating a second correction amount based on the first correction amount when the zoom magnification ratio is determined to be higher than the threshold value in the determination step; and a correction step of correcting the image picked up in the image pickup step based on the first correction amount or the second correction amount.

In the image processing apparatus and method and the computer readable program according to the first aspect of the present invention, the correction amount for reducing the influence of the exerted vibration can be calculated. At the time that the correction amount is calculated, if the zoom magnification ratio is higher than the predetermined threshold value, the correction amount is changed into a correction having a value which is smaller than that of the previously calculated correction amount, and processes for reducing the influence of the exerted vibration are performed by using the correction amount having a smaller value.

According to a second aspect of the invention, there is provided an image processing apparatus comprising: an image pickup unit picking up an image with an image pickup device; a vibration amount output unit detecting exerted vibration and outputting a vibration amount indicating a size of the vibration; a setting unit setting a point number of correction amounts for reducing influence of the vibration to the image in one screen according to a zoom magnification ratio; a calculation unit calculating correction amounts corresponding to the point numbers set by the setting unit; and a correction unit correcting the image picked up by the image pickup unit based on the correction amounts calculated by the calculation unit.

In the aforementioned aspect of the present invention, when the zoom magnification ratio is higher than a predetermined threshold value at a time that the image is picked up by the image pickup unit, the setting unit may set the point number.

According to a second aspect of the invention, there is provided an image processing method comprising: an image pickup step of picking up an image with an image pickup device; a vibration amount output step of detecting exerted vibration and outputting a vibration amount indicating a size of the vibration; a setting step of setting a point number of correction amounts for reducing influence of the vibration to the image in one screen according to a zoom magnification ratio; a calculation step of calculating correction amounts corresponding to the point numbers set in the setting step; and a correction step of correcting the image picked up by the image pickup step of based on the correction amounts calculated in the calculation step.

According to a second aspect of the invention, there is provided a computer readable program comprising: an image pickup step of picking up an image with an image pickup device; a vibration amount output step of detecting exerted vibration and outputting a vibration amount indicating a size of the vibration; a setting step of setting a point number of correction amounts for reducing influence of the vibration to the image in one screen according to a zoom magnification ratio; a calculation step of calculating correction amounts corresponding to the point numbers set in the setting step; and a correction step of correcting the image picked up by the image pickup step of based on the correction amounts calculated in the calculation step.

In the image processing apparatus and method and the computer readable program according to the second aspect of the present invention, the correction amount for reducing the influence of the exerted vibration can be calculated. At the time that the correction amount is calculated, if the zoom magnification ratio is higher than the predetermined threshold value, correction amounts corresponding to the point number which is smaller than that of a case where the zoom magnification ratio is lower than the predetermined threshold value, and processes for reducing the influence of the exerted vibration are performed by using the correction amount having a smaller value.

According to a third aspect of the invention, there is provided an image processing apparatus comprising: an image pickup unit picking up an image with an image pickup device; a setting unit setting a to-be-processed region according to a zoom magnification ratio in the image picked up by the image pickup unit; and a processing unit processing only an inner portion of the region set by the setting unit.

In the aforementioned aspect of the present invention, when the zoom magnification ratio is higher than a predetermined threshold value at a time that the image is picked up by the image pickup unit, the setting unit may set the to-be-processed region.

In addition, the image processing apparatus may further comprise: a vibration amount output unit detecting exerted vibration and outputting a vibration amount indicating a size of the vibration; and a calculation unit calculating correction amounts for reducing influence of the vibration to the image from the vibration amount output by the vibration amount output unit, wherein the processing unit may correct the image picked up by the image pickup unit based on the correction amount.

According to a third aspect of the invention, there is provided an image processing method comprising: an image pickup step of picking up an image with an image pickup device; a setting step of setting a to-be-processed region according to a zoom magnification ratio in the image picked up in the image pickup step; and a processing step of processing only an inner portion of the region set in the setting step.

According to a third aspect of the invention, there is provided a computer readable program comprising: an image pickup step of picking up an image with an image pickup device; a setting step of setting a to-be-processed region according to a zoom magnification ratio in the image picked up in the image pickup step; and a processing step of processing only an inner portion of the region set in the setting step.

In the image processing apparatus and method and the computer readable program according to the third aspect of the present invention, the to-be-processed region in the picked up image is set according to the zoom magnification ratio, and processes are performed on only the inner portion of the set region.

According to the present invention, it is possible to perform hand shake correction (correction for reducing influence of vibration) suitable for situations.

According to the present invention, it is possible to perform hand shake correction suitable for zoom magnification ratios. In addition, according to the present invention, it is possible to reduce the number of processes associated with at the hand shake correction at a time of zooming.

BRIEF DESCRIPTION OF THE DRAWINGS

The invention will be described with reference to the accompanying drawings, wherein like numbers reference like elements.

DESCRIPTION OF THE PREFERRED EMBODIMENTS

Figure 1:
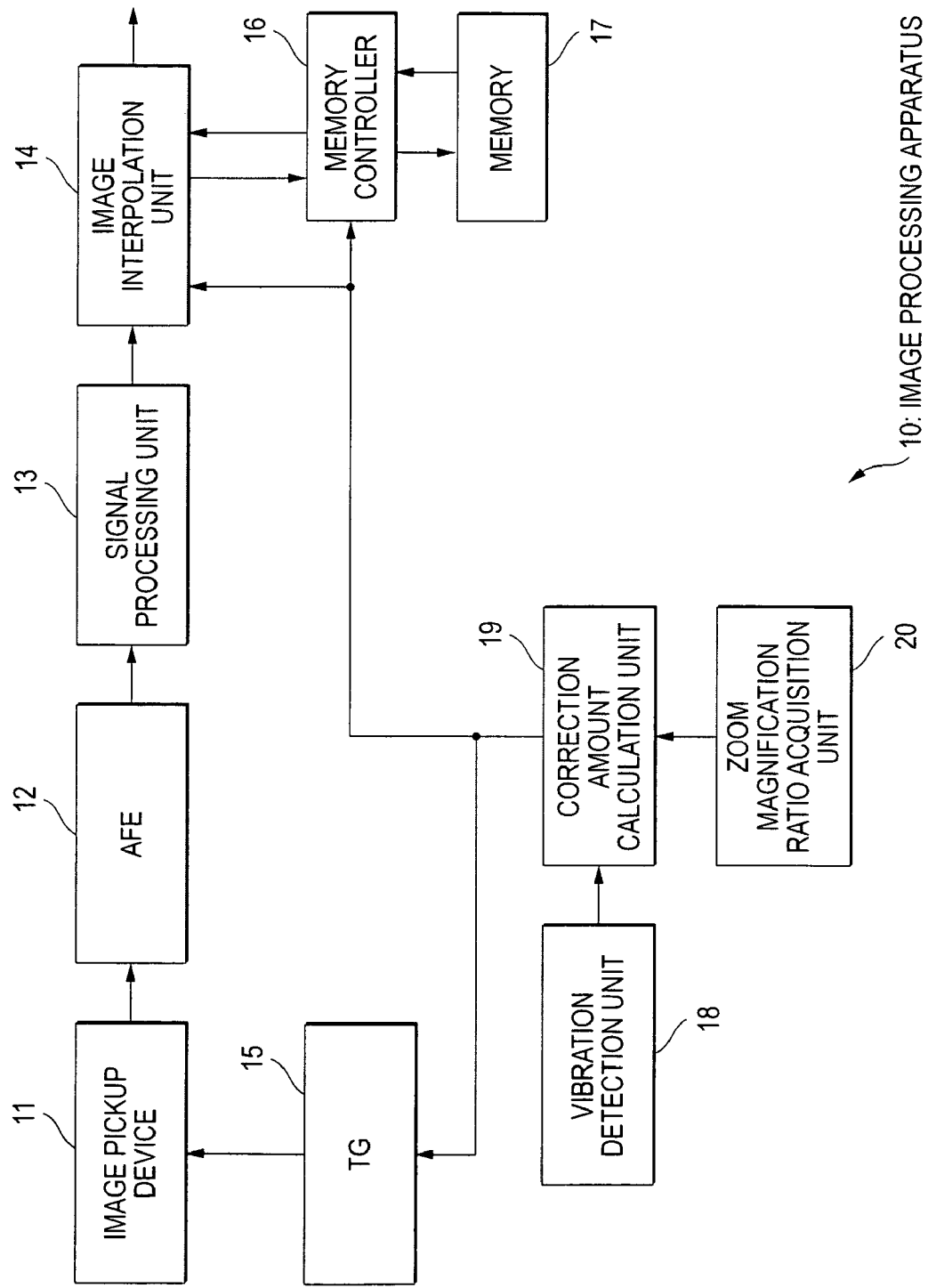
FIG. 1 is a view showing a construction of an image processing apparatus according to an embodiment of the present invention.

Now, the preferred embodiments of the present invention will be described. The embodiments correspond to the aforementioned aspects of the present invention as follows. Although embodiments described in the specification is not definitely exemplified in the following embodiments corresponding to the aspects of the present invention, the embodiments is included in the present invention. In addition, although an embodiment is described to correspond to an aspect of the present invention, the embodiment is included in the other aspects of the present invention.

In addition, the following embodiments do not intend to be all the invention described in the specification. In other words, the following embodiments do not limit or exclude a presence of the invention which is described in the specification but not claimed in Claims, that is, an occurrence or addition of the invention by application division or correction.

According to a first embodiment of the present invention, there is provided an image processing apparatus including: an image pickup unit (for example, an, image pickup device 11 of FIG. 1) picking up an image with an image pickup device; a vibration amount output unit (for example, a vibration detection unit 18 of FIG. 1) detecting exerted vibration and outputting a vibration amount indicating a size of the vibration; a calculation unit (for example, a correction amount calculation unit 19 of FIG. 1) calculating a first correction amount for reducing influence of the vibration to the image from the vibration amount output by the vibration amount output unit; a determination unit (for example, the correction amount calculation unit 19 of FIG. 1) determining whether or not a zoom magnification ratio at a time that the image is picked up by the image pickup unit is higher than a predetermined threshold; a generation unit (for example, the correction amount calculation unit 19 of FIG. 1) generating a second correction amount based on the first correction amount when the zoom magnification ratio is determined to be higher than the threshold value by the determination unit; and a correction unit (for example, an image interpolation unit 14 of FIG. 1) correcting the image picked up by the image pickup unit based on the first correction amount or the second correction amount.

According to a second embodiment of the present invention, there is provided an image processing apparatus including: an image pickup unit (for example, an image pickup device 11 of FIG. 1) picking up an image with an image pickup device; a vibration amount output unit (for example, a vibration detection unit 18 of FIG. 1) detecting exerted vibration and outputting a vibration amount indicating a size of the vibration; a setting unit (for example, a correction amount calculation unit 19 of FIG. 1) setting a point number of correction amounts for reducing influence of the vibration to the image in one screen according to a zoom magnification ratio; a calculation unit (for example, the correction amount calculation unit 19 of FIG. 1) calculating correction amounts corresponding to the point numbers set by the setting unit; and a correction unit (for example, an image interpolation unit 14 of FIG. 1) correcting the image picked up by the image pickup unit based on the correction amounts calculated by the calculation unit.

According to a third embodiment of the present invention, there is provided an image processing apparatus comprising: an image pickup unit (for example, an image pickup device 11 of FIG. 1) picking up an image with an image pickup device; a setting unit (for example, a correction amount calculation unit 19 of FIG. 1) setting a to-be-processed region in the image picked up by the image pickup unit according to a zoom magnification ratio; and a processing unit (for example, an image interpolation unit 14 of FIG. 1) processing only an inner portion of the region set by the setting unit.

In the aforementioned embodiment of the present invention, the image processing apparatus may further comprise: a vibration amount output unit (for example, a vibration detection unit 18 of FIG. 1) detecting exerted vibration and outputting a vibration amount indicating a size of the vibration; and a calculation unit (for example, a correction amount calculation unit 19 of FIG. 1) calculating correction amounts for reducing influence of the vibration to the image from the vibration amount output by the vibration amount output unit, wherein the processing unit may correct the image picked up by the image pickup unit based on the correction amount.

Hereinafter, the embodiments of the present invention will be described in detail with reference to the accompanying drawings.

[Construction of Image Processing Apparatus]

FIG. 1 is a view showing a construction of an image processing apparatus according to an embodiment of the present invention. The image pickup device 11 of the image processing unit 10 is constructed with, for example, an X-Y address type solid-state image pickup device such as a CMOS sensor. Image data of an object picked up by the image pickup device 11 are supplied to an analog front end (AFE) 12.

The AFE 12 converts the supplied image data to digital signals for the image data and supplies the image data to a signal processing unit 13. The signal processing unit 13 calculates brightness signals and color difference signals based on the supplied image data and supplies the calculated signals to the image signal interpolation unit 14.

Although the image data supplied to the image interpolation unit 14 is the image data of an object picked up by the image pickup device 11, all the image data of the image picked up by the image pickup device 11 are not supplied to the image interpolation unit 14. Only the data read out according to timings from a timing generator (TG) 15 are supplied to the image interpolation unit 14.

The data supplied to the image interpolation unit 14 is supplied to a memory 17 under the control of a memory controller 16. The data stored in the memory 17 are read out and supplied to the image interpolation unit 14 according to commands of the memory controller 16. The image interpolation unit 14 performs an interpolation process (described later in detail) on the supplied data for reducing influence of vibration and outputs and records results of the process in a recording medium (not shown) or outputs and displays the result of the process on a display unit (not shown). As an example of the vibration exerted on the image processing apparatus 10, there may be hand shake of a user.

The image interpolation unit 14, the TG 15, and the memory controller 16 performs controlling based on the correction amount calculated by the correction amount calculation unit 19 according to the vibration amount detected by the vibration detection unit 18.

The vibration detection unit 18 detects the vibration exerted on the image processing apparatus 10 during the pickup process thereof by using, for example, a method of using a sensor such as an angular velocity sensor or a sensorless vibration detection method such an image processing method. In case of the vibration detection unit 18 constructed with the angular velocity sensor, the angular velocity sensor supplies data of a pitching direction, a yawing direction, and angular velocities exerted in the directions to the correction amount calculation unit 19.

The correction amount calculation unit 19 calculates correction amount data for correcting movement caused from the vibration based on the detected vibration amount. When calculating the correction amount, the correction amount calculation unit 19 performs the calculation by referring to information on a zoom magnification ratio acquired by the zoom magnification ratio acquisition unit 20.

The "zoom" denotes an operation of magnifying and picking up an object and a magnification ratio denotes a value indicating how much the image is magnified and picked up with. As an example of the image processing apparatus 10, in a digital camera where the image data of an object picked up is processed as the digital data, the zoom is generally classified into optical zoom and electronic zoom.

In the optical zoom, lens included in the image pickup device 11 is driven to magnify the picked up image of the object. In the electronic zoom, the picked up image of the object is electronically processed to magnify the image. Hereinafter, if not definitely described, a zoom magnification ratio denotes a magnification ratio of the electronic zoom.

Referring to FIG. 1, in the construction of the image processing apparatus 10, the correction amount calculation unit 19 calculates the correction amount line-by-line by using the supplied data, wherein the correction amount corresponds to how many pixels are to be moved so as to reduce the influence of the exerted vibration. Here, the term "line-by-line" denotes sequentially reading the image data in units of one line in the solid-state image pickup device such as CMOS. Therefore, the correction amount is basically calculated line-by-line. Here, the terms "basically calculated" intends to include some cases where the correction amount is not necessarily calculated line-by-line according to the zoom magnification ratios as described later.

Figure 2:
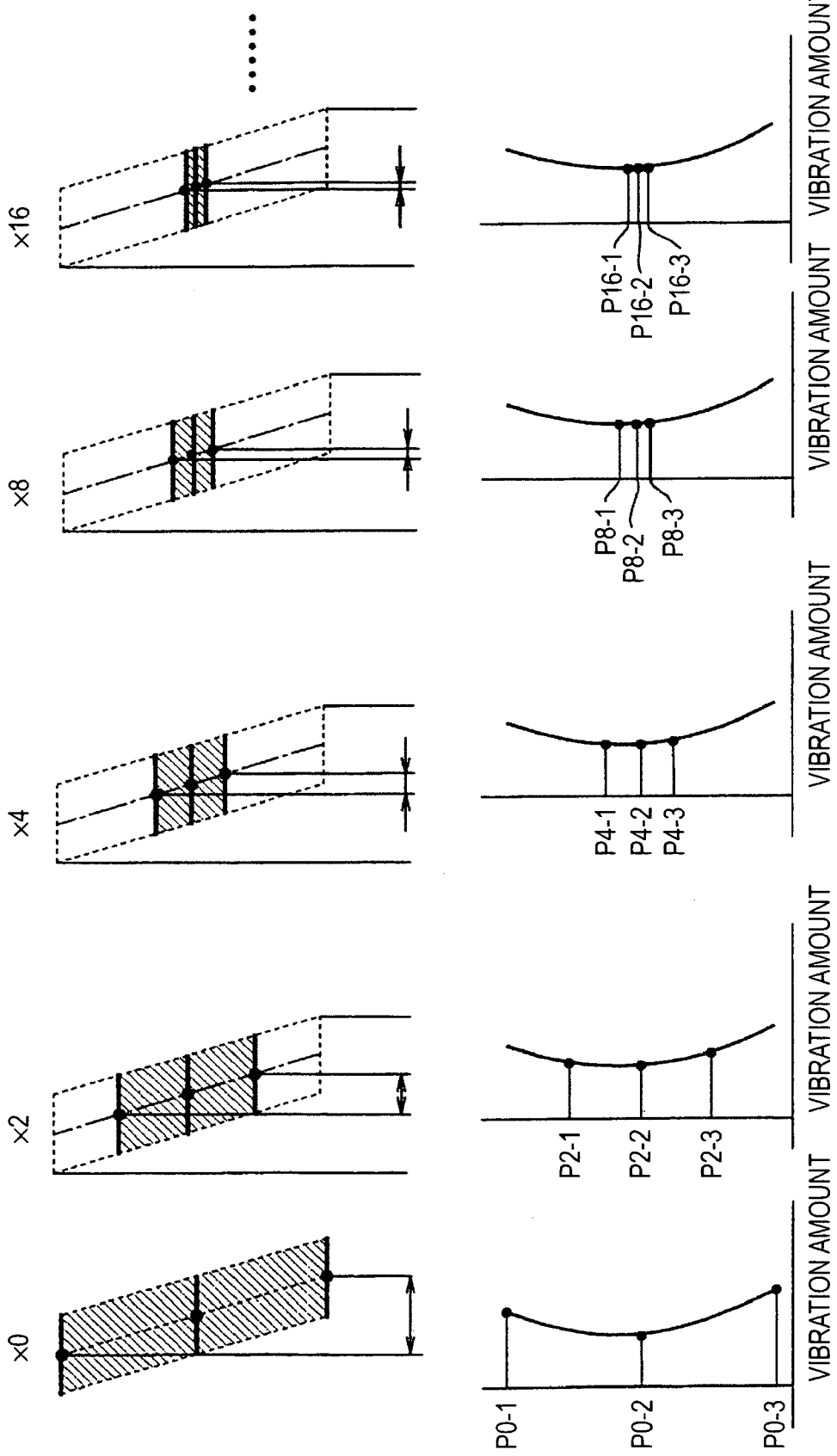
FIG. 2 is a view for explaining vibration amounts.

Now, the zoom magnification ratio and the correction amount in the electronic zoom will be described with reference to FIG. 2. FIG. 2 is a view showing a relation between the correction amount for removing the vibration exerted on the X-Y address type solid-state device during the image pickup process thereof and regions which are processed according to the zoom magnification ratios.

In FIG. 2, "×0" denotes an electronic zoom magnification ratio of from 0 to 1. FIG. 2 shows a state of which electronic zoom magnification ratio is 1. Similarly, "×2" denotes an electronic zoom magnification ratio of 2, "×4" denotes an electronic zoom magnification ratio of 4, "×8" denotes an electronic zoom magnification ratio of 8, and "×16" denotes an electronic zoom magnification ratio of 16.

In addition, in FIG. 2, the figure of the magnification ratio of 0 substantially shows a figure of the magnification ratio of 1. The electronic zoom magnification ratio of from 0 to 1 corresponds to a reduced image pick up operation. The electronic zoom magnification ratio of 1 corresponds to an equivalent image pick up operation. The following described embodiments relate to the process in the magnified image pick up operation, and thus, in the description thereof, ×0 (magnification ratio of 0) intends to denote the magnification ratio of from 0 to 1.

With respect to the zoom, when the magnification ratio is 0, processes corresponding to the electronic zoom are not performed, but only processes corresponding to the optical zoom are performed. In a state that the only the processes corresponding to the optical zoom are performed (in a sate that the electronic zoom magnification ratio is 0), the number of lines constituting one screen is N. When the electronic zoom magnification ratio is 0, the number or the lines constituting one screen is N, so that the number does not change according to the optical zoom magnification ratio.

Unlike the processes corresponding to the optical zoom, in the processes corresponding to the electronic zoom, the number of lines constituting one screen changes according to the magnification ratio. In the electronic zoom, the number of lines constituting one screen in the optical zoom is reduced, and a predetermined number of lines according to the magnification ratio are used to constituting one screen. Namely, the number of lines constituting one screen is equal to or smaller than N according to the magnification ratio.

In FIG. 2, portions indicated with hatching lines show one screen according to each of the magnification ratios. Since reading out is performed line-by-line (or on pixel basis) in the X-Y address type solid state device, timings of initiating reading out of respective lines are different. Therefore, as shown in FIG. 2, if the reading out one screen is illustrated line-by-line with respect to time, a portion where the data for the one screen are read out becomes a trapezoid.

If the number (N) of lines in one screen at the electronic zoom magnification ratio "×0" is taken as a reference number, one screen at the electronic zoom magnification ratio "×2" is constructed with a half (½N) of the reference number of lines. In addition, one screen at the electronic zoom magnification ratio "×4" is constructed with ¼ (¼N) of the reference number of lines.

In addition, one screen at the electronic zoom magnification ratio "×8" is constructed with ⅛ (⅛N) of the reference number of lines. In addition, one screen at the electronic zoom magnification ratio "×16" is constructed with 1/16 (1/16N) of the reference number of lines.

In this manner, when the processes corresponding to the electronic zoom are performed, the number of lines constituting one screen is different according to the electronic zoom magnification ratios.

Various kinds of vibration may be exerted on the image processing apparatus 10. The most serious vibration is caused from vibration by hand, i.e., hand shake of a user who grips the image processing apparatus 10. In order to perform a process for reducing bad influence of the vibration to the image caused mainly by the hand shake, information (vibration amount) on the vibration is acquired. Hereinafter, the vibration amount will be additionally described.

The information on the vibration amount shown in a lower figures of FIG. 2 is detected by the vibration detection unit 18 (FIG. 1) and supplied to the correction amount calculation unit 19. In an example shown in FIG. 2, the vibration detection unit 18 acquires three vibration amounts in one screen. Referring to the lower figures of FIG. 2, the vibration amounts are acquired from three lines of first, central, and last lines in one screen. Curves shown in the lower figures of FIG. 2 indicate change in the exerted vibration amounts.

When the magnification ratio is "×0", the acquired vibration amounts are vibration amounts P0-1, P0-2, and P0-3. In the denotation "vibration amount P0-1", a number before the hyphen (-) denotes a magnification ratio in zoom (in this case, 0), and a number following the hyphen denotes an identifier for description (in this case, 1). Other denotations have the same meanings.

When the magnification ratio is "×2", the acquired vibration amounts are vibration amounts P2-1, P2-2, and P2-3. When the magnification ratio is "×4", the acquired vibration amounts are vibration amounts P4-1, P4-2, and P4-3. When the magnification ratio is "×8", the acquired vibration amounts are vibration amounts P8-1, P8-2, and P8-3. When the magnification ratio is "×16", the acquired vibration amounts are vibration amounts P16-1, P16-2, and P16-3.

Although the vibration amounts are acquired from three points in one image for the convenience of description, the vibration amounts are practically acquired from more than three points.

[Operations of Image Processing Apparatus]

Now, operations of the image processing apparatus 10 having the construction shown in FIG. 1 will be described with reference to flowcharts FIGS. 3 and 5. As described above, the image processing apparatus 10 performs a process for reducing the influence of the exerted vibration, and more particularly, a process for reducing the influence of the exerted vibration at the time that a process for the electronic zoom is performed.

In the following description, three embodiments of a high magnification process will be described. Firstly, a first embodiment will be described.

[Multiplication of Coefficient According to Magnification Ratio]

In Step S11, the correction amount acquisition unit 19 acquires the data of the vibration amount detected by the vibration detection unit 18. For example, the information shown in the lower figures of FIG. 2 is detected by the vibration detection unit 18 and supplied to the correction amount acquisition unit 19.

When the vibration amounts are acquired from the predetermined lines, the correction amount acquisition unit 19 performs the calculation of the correction amounts in Step S12. The correction amount denotes a value having a unit of pixels indicating how much correction is performed on the vibration amount to obtain a state that the vibration does not exist (a state that the influence of vibration is reduced).

For example, as shown in the lower figures of FIG. 2, when the vibration amount P0-1 of the first line is (P0-1) pixels, in order to change the state that the vibration amount is (P0-1) pixels into the state that the vibration does not exist, an opposite sign of the absolute value thereof (in this case, –(P0-1) pixels) are calculated as the correction amount. Similarly, the correction amounts for the other lines are calculated from the vibration amounts of the other lines.

In addition, the correction amounts are calculated line-by-line. Although the vibration amounts are acquired from the three lines of the first, central, and last lines, the correction amounts for lines other than the three lines from which vibration amounts are not acquired can be calculated from the vibration amounts acquired from the three lines.

Any calculation method may be used. Although the three vibration amounts are acquired here, the vibration amounts of all the lines constituting one screen may be acquired. In addition, the correction amount for all the lines may be calculated from the acquired vibration amounts.

Figure 3:
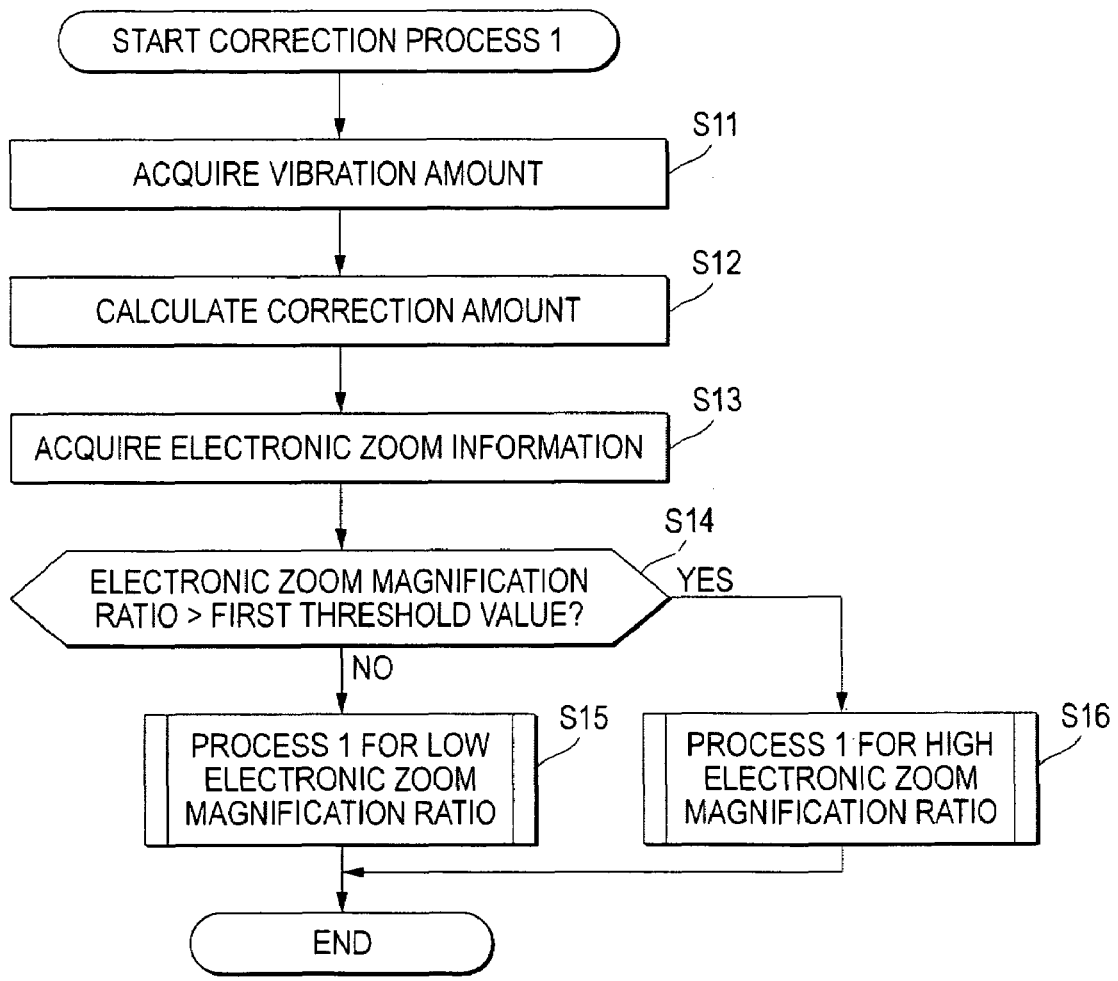
FIG. 3 is a flowchart for explaining operations of an image processing apparatus.

When the correction amounts are calculated, the zoom magnification ratio is acquired in Step S13 (FIG. 3). The information on the zoom magnification ratio is acquired by the zoom magnification acquisition unit 20 and supplied to correction amount acquisition unit 19. The correction amount acquisition unit. 19 determines whether or not the zoom magnification ratio supplied in Step S14 is higher than a first threshold value (whether or not a conduction of (zoom magnification ratio)>(first threshold value) is satisfied).

In the embodiment, the zoom magnification ratio is divided into low and high magnification ratios. Different processes (correction processes) for reducing the influence of the vibration are performed for the low and high magnification ratios. In Step S14, a process for determining whether the zoom magnification ratio is the low magnification ratio or the high magnification ratio at the time point (a time point that the process of Step S14 is performed) is performed.

The first threshold value used in Step S14 is a value for dividing the zoom magnification ratio into the low and high magnification ratios. When the zoom magnification ratio is determined to be lower than the first threshold value in Step S14, namely, when the zoom magnification ratio is determined to be the low magnification ratio, the process proceeds to Step S15, and a process for the low magnification ratio is performed. When the zoom magnification ratio is determined to be higher than the first threshold value in Step S14, namely, when the zoom magnification ratio is determined to be the high magnification ratio, the process proceeds to Step S16, and a process for the high magnification ratio is performed.

Figure 4:
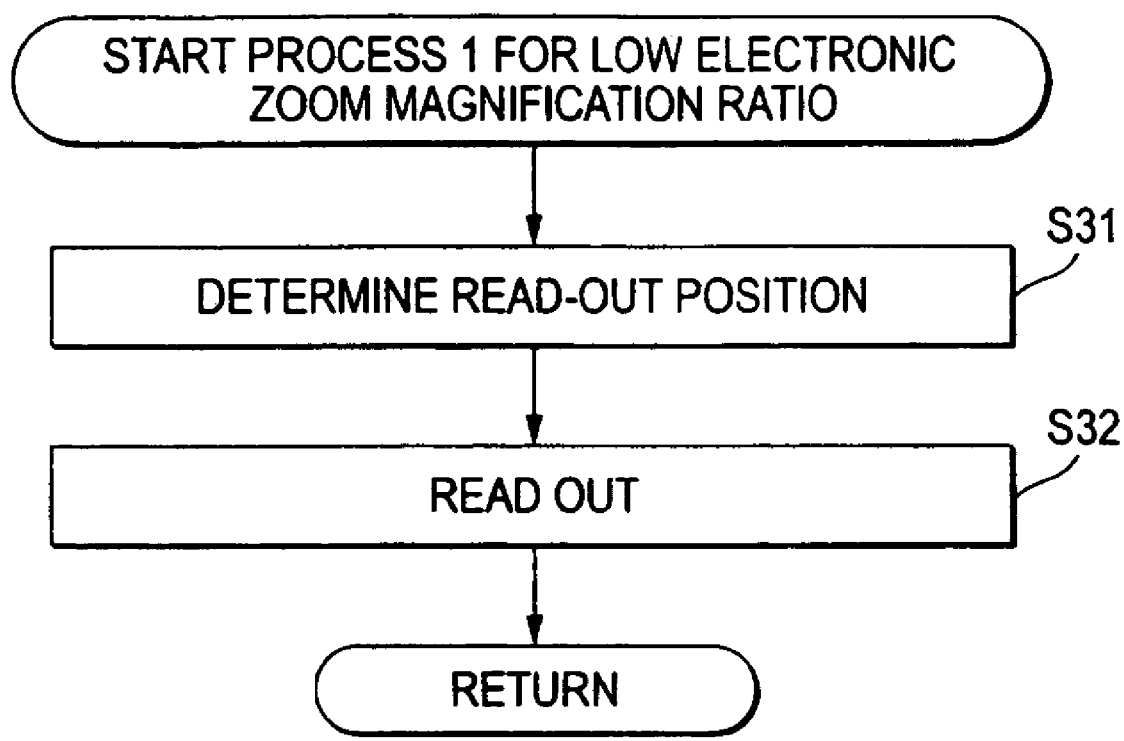
FIG. 4 is a flowchart for explaining processes for a low magnification ratio.

Now, the process for the low magnification ratio performed in Step S15 and the process for the high magnification ratio performed in Step S16 will be described. Firstly, the process for the low magnification ratio performed in Step S15 will be described with reference to a flowchart of FIG. 4.

In Step S31, a read out start position is determined. The read out start position is determined based on the correction amounts calculated in Step S12. Since the correction amounts are calculated line-by-line, the read out start position of each line is determined based on the correction amounts for each line, namely, based on data on how many pixels are deviated from the to-be-read out position.

When the read out start position is determined, the data are read out from the read out start position determined in Step S32. In this manner, the correction amounts are calculated line-by-line, and the position on the line from which reading out of the data is to be started is determined based on the calculated correction amounts, so that the influence of the vibration can be corrected line-by-line. Accordingly, an image of which bad effect caused from the vibration is reduced can be provided to the user.

In addition, the process associated with the correction employs the invention disclosed in Japanese Unexamined Patent Application Publication No. 2004-266322 which is previously filed by the inventors.

Next, the process for the high magnification ratio performed in Step 16 (FIG. 3) will be described with reference to a flowchart of FIG. 5. In Step S51, a representative amount is selected. Referring to the lower figures of FIG. 2, the vibration amounts of the predetermined lines are acquired, and the correction amounts are calculated line-by-line. At this time, a correction amount for one line is selected as the representative amount.

As described later, in the high magnification ratio, the correction amounts calculated from the lines are not directly used for the lines, but the correction amount for at least one line is used as the representative amount. Namely, for example, in a case where one screen is constructed with 10 lines, although 10 correction amounts are calculated, at least one of the 10 correction amounts is used for the correction process described later.

For example, a correction amount for a line of which correction amount is firstly calculated among the lines of one screen is selected as the representative amount. For example, when the magnification ratio is ×2 in FIG. 2, the correction amount (hereinafter, denoted by correction amount P2-1 and the other correction amounts also denoted similarly) calculated from the vibration amount P2-1 is selected as the representative amount. In this case, the correction amount for one line is used.

Alternatively, an average value of the correction amount (correction amount P2-1 in FIG. 2) for the line of which correction amount is firstly calculated among the lines of one screen and the correction amount (correction amount P2-3 in FIG. 2) for the line of which correction amount is lastly calculated among the lines of one screen is calculated, and the average value may be selected as the representative amount. In this case, the correction amount for two lines is used.

Alternatively, a correction amount (for example, the correction amount P2-2 calculated from the vibration amount P2-2 in the magnification ratio of ×2 in FIG. 2) which is acquired from a line located at a center of the image may be selected as the representative amount.

As a method of selecting the representative amount, the aforementioned method may be considered, and any other method may be considered. Methods other than the aforementioned method may be used.

Here, the case where the correction amount firstly calculated is selected as the representative amount is exemplified and described. By selecting the correction amount firstly calculated as the representative amount, the following advantages can be obtained. If the correction amount lastly calculated is selected as the representative amount (if the last correction amount is used), the data of the vibration amount of the last line has to be acquired in order to determine the representative amount. Therefore, in order to determine the representative amount, a memory having a capacity which can store all the data from the vibration amount data of the first line to the vibration amount data of the last line, that is, a memory having a capacity which can store the data for one screen is required.

However, by using the correction amount firstly calculated as the representative amount, in at least the process for determining the representative amount, the memory having a capacity which can store the data for one screen is not required, but a memory having a capacity which can store the data for one line in the one screen is sufficient. In other words, the capacity of the memory can be reduced.

Figure 5:
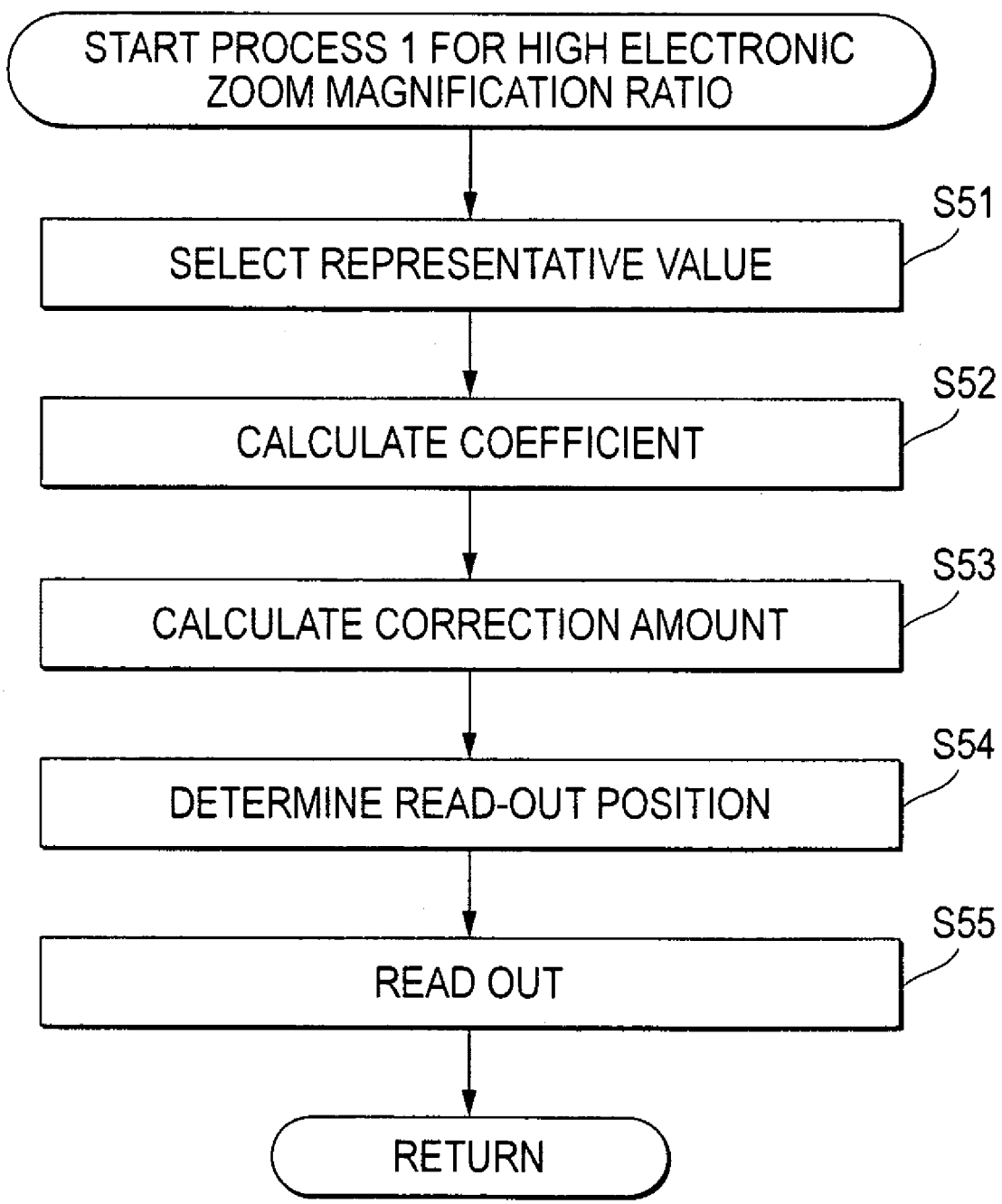
FIG. 5 is a flowchart for explaining processes for a high magnification ratio.

Returning to the description of the flowchart of FIG. 5, when the representative amount is determined in Step S51, coefficients are calculated in Step S52. Now, the coefficients will be additionally described. With respect to the correction amounts other than the representative amount, the correction amounts calculated from the lines multiplied with predetermined coefficients are defined as new correction amounts, and the new correction amounts are used as correction amounts for the lines.

More specifically, in the process for the low magnification ratio, the correction amounts are calculated line-by-line from the vibration amounts acquired line-by-line or from a predetermined line, and the correction is performed by using the correction amounts. In the process for the high magnification ratio, the correction amounts are calculated line-by-line, the correction amounts other than the representative amount are multiplied with the coefficients, and the correction is performed by using the correction amounts multiplied with the coefficients.

Figure 6:
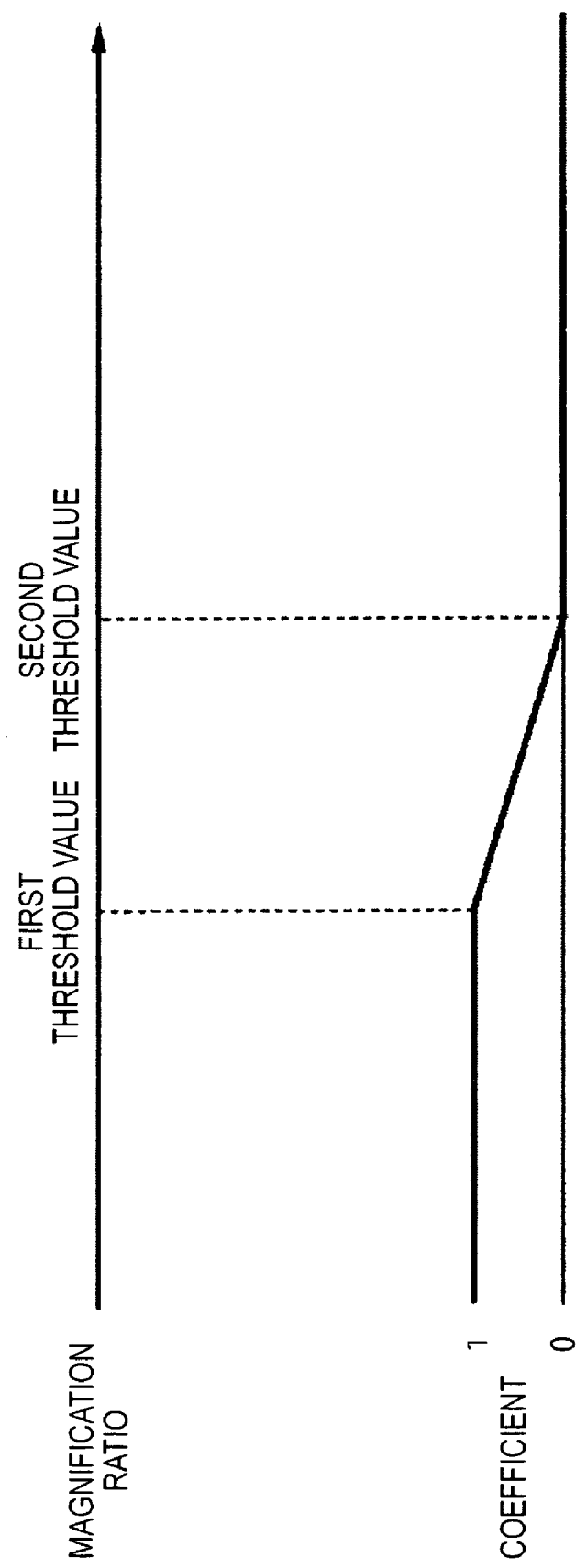
FIG. 6 is a view for explaining threshold values.

The coefficients are determined depending on the zoom magnification ratios. The description thereof is made with reference to FIG. 6. FIG. 6 is a view showing a relation between the zoom magnification ratios and the coefficients. As described above, the first threshold value is a threshold value for identifying the low and high magnification ratios in Step S14 (FIG. 3). When the zoom magnification ratio is equal to or higher than the first threshold value, the process for the high magnification ratio is performed, and the coefficients to be multiplied to the correction amounts are set. For example, the first threshold value may be set to ×2.

When the zoom magnification ratio is lower than the first threshold value, that is, when the zoom magnification ratio is the low magnification ratio, the coefficient is set to 1. Since the coefficient is 1, the calculated value of the correction amount does not change. Therefore, in the low magnification ratio, as described with reference to FIG. 4, the processes of calculating coefficients and multiplying the correction amounts with the coefficients are not performed.

When the zoom magnification ratio is a magnification ratio between the first and second threshold values, in the example shown in FIG. 6, the coefficients linearly proportional to the zoom magnification ratio is determined (calculated).

When the zoom magnification ratio is equal to or higher than the second threshold value, the coefficient is set to 0. Since the coefficient is 0, the correction amounts finally become 0, and the associated process is performed. The process denotes that the correction associated with the correction amount other than the representative amount is not performed.

The relation between the zoom magnification ratio and the coefficient shown in FIG. 6 is an example, but the present invention is not limited to such determination of the coefficients. As an alternative coefficient calculation method, when the zoom magnification ratio is higher than the first threshold value, the coefficient may be set to 0. In this case, since the threshold value is 1 or 0 with reference to the first threshold value, the correction is performed or not. Alternatively, when the zoom magnification ratio is higher than the first threshold value, coefficients for even-numbered lines may be set to 1 (or less than 1), and coefficients for odd-numbered lines may be set to 0. In this manner, different coefficients may be set to different lines.

In addition, in the above example, when the zoom magnification ratio is higher than the second threshold value, the coefficient is set to 0. However, alternatively, the coefficients may be set to values other than 0, for example, 0.5. In other word, when the zoom magnification ratio is equal to or higher than the second threshold value, the correction is not completely performed, but weaker correction is performed than that of a normal case (low magnification ratio).

Although any coefficient calculation method may be used, the correction for the high magnification ratio is performed by using not the correction amounts themselves but the correction amounts multiplied with the coefficients. Now, as shown in FIG. 6, the process for the case where the coefficients are determined (calculated) depending on the zoom magnification ratio is described. Processes associated with other correction amounts will be described later.

When the coefficient is calculated in Step S52, the correction amounts are calculated in Step S53. With respect to the correction amounts, although the correction amounts are calculated previously in Step S12 (FIG. 3), in Step S52, new correction amounts are calculated by multiplying the previously calculated correction amounts with the determined coefficient.

For example, in a case where one image in a predetermined magnification ratio is constructed with 10 lines, 10 correction amounts are calculated. Among the correction amounts, the correction amount firstly calculated, for example, the correction amount P2-1 calculated from the vibration amount P2-1 in the magnification ratio ×2 in FIG. 2, is selected as the representative amount, and the correction amounts for the other lines are multiplied with the coefficient calculated in Step S52. The correction amounts multiplied with the coefficient are set to new correction amounts.

In the embodiment, the correction amount selected as the representative amount is used for the correction. The correction amounts other than the representative amount are multiplied with the coefficient and then used for the correction.

The coefficient may be multiplied to the previously calculated correction amounts, and alternatively, the coefficient may be multiplied to the correction amounts which are subject to other processes. For example, differences between the correction amount for the lines and the representative amount may be calculated, and the differences may be multiplied with the coefficient. In this case, the representative amount does not change, but the correction amounts for other lines be set to the differences between the representative amount and the correction amounts multiplied with the coefficient.

In addition, similar to the other correction amounts, the representative amount may be multiplied with the coefficient.

In Step S54, the read out start position is determined based on the set correction amounts. Next, the data are read out from the determined read out start position in Step S55.

As described above, a value ranging from 0 to 1 is allocated to the coefficient. Therefore, the correction amount (the correction amount calculated in the process of Step S53) multiplied with the coefficient is smaller than the correction amount (the correction amount calculated in Step S12) before the multiplication of the coefficient.

Namely, for the correction in the low magnification ratio, the correction amounts calculated in Step S12 are used. However, for the correction in the high magnification ratio, the correction amounts is multiplied with the coefficient to change into smaller correction amounts and then used for the correction. Therefore, although the same size of vibration is exerted, the correction amounts for the high magnification ratio are smaller than the correction amounts for the low magnification ratio.

However, in general, in comparison with the low magnification ratio, in the high magnification ratio, a time interval when the hand shake (vibration) is exerted is short, so that the vibration amount is not easily accumulated. Returning to FIG. 2, a time interval from a time that the vibration amount P16-1 is acquired to a time that the vibration amount P16-3 is acquired is shorter than a time interval from a time that the vibration amount P0-1 is acquired to a time that the vibration amount P0-3 is acquired. Therefore, in comparison with the low magnification ratio, in the high magnification ratio, the vibration amount is not easily accumulated.

The not-easy accumulation of the vibration amounts denotes that the influence of the vibration cannot be easily exerted. Although the same size of vibration is exerted in the cases of magnification ratios ×0 and ×16, the time interval when the vibration amount in the magnification ratio ×16 is acquired is shorter than the time interval when the vibration amount in the magnification ratio ×0 is acquired, the time interval when the influence, of the hand shake occurs is short. Since the time interval when the influence of the hand shake occurs is short, it can be consider that the influence of the hand shake is small.

Therefore, as described above, although weaker correction for the high magnification ratio is performed than the correction for the low magnification ratio, suitable correction for the hand shake can be performed without deterioration in correction performance for the high magnification ratio.

Figure 7:
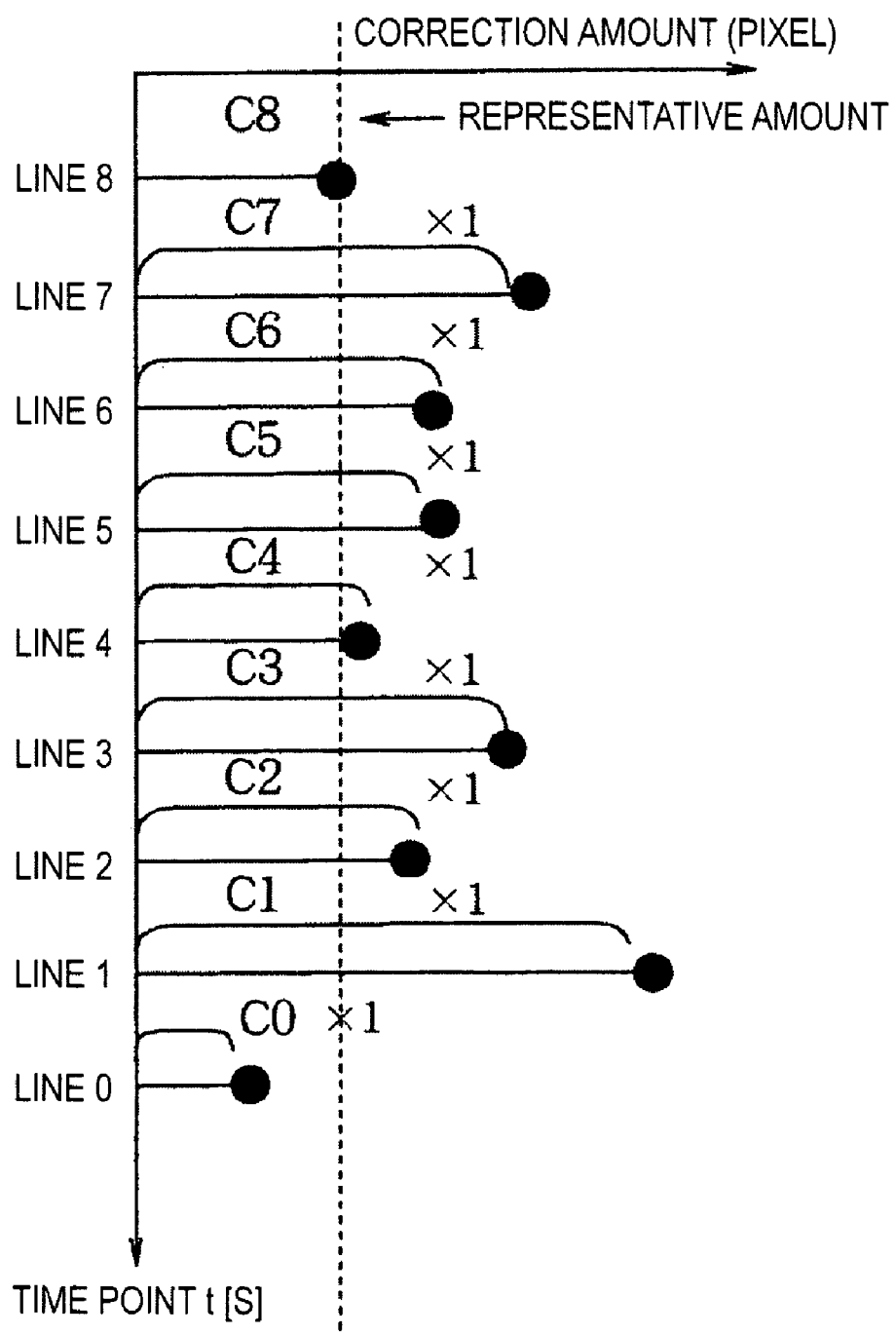
FIG. 7 is a view for explaining correction amounts and a coefficient.

The multiplication of the coefficient in the high magnification ratio so as to allow the correction amounts to be shorter than those in the low magnification ratio will be described with reference to the accompanying drawings. FIG. 7 shows the correction amount calculated from the vibration amounts shown in FIG. 2.

Since the correction amount is, added in a direction which the influence of the vibration amount is removed, in FIG. 7 corresponds to FIG. 2, the direction of the vibration amount and the direction of the correction amount are opposite to each other, so that the correction amount of FIG. 7 is illustrated in the opposite direction. In addition, the directions of the correction amounts for lines depend on the direction of the vibration amounts, so that the directions of the correction amounts for lines may be different from each other line-by-line. However, for the convenience of description, the directions are illustrated as the same direction. In other figures, the directions are illustrated in the same manner.

As described above, in the electronic zoom, the number of lines constituting one screen changes according to the magnification ratio. However, although there are different magnification ratios (although there are three magnification ratios including a magnification ratio equal to or lower than the first threshold value, a magnification ratio between the first and second threshold values, and a magnification ratio is equal to or higher than the second threshold value), for the convenience of later description, the lines constituting the one screen are set to 9 lines Line 0 to Line 8. In addition, the first line (for example, the line where the vibration amount P0-1 is acquired in FIG. 2) is set to Line 8.

In FIG. 7, the correction amount for Line 8 is a correction amount C8. The correction amount C8 is selected as the representative amount. The zoom magnification ratio in which the correction amounts shown in FIG. 7 are calculated is a magnification ratio lower than the first threshold value. Namely, the correction amounts calculated in the low magnification ratio are shown. In this case, the correction amounts C7 to C0 other than the representative amount is multiplied with the coefficient of 1 (or, the multiplication of the coefficient may be omitted and the calculated correction amounts may be sued).

Figure 8A:
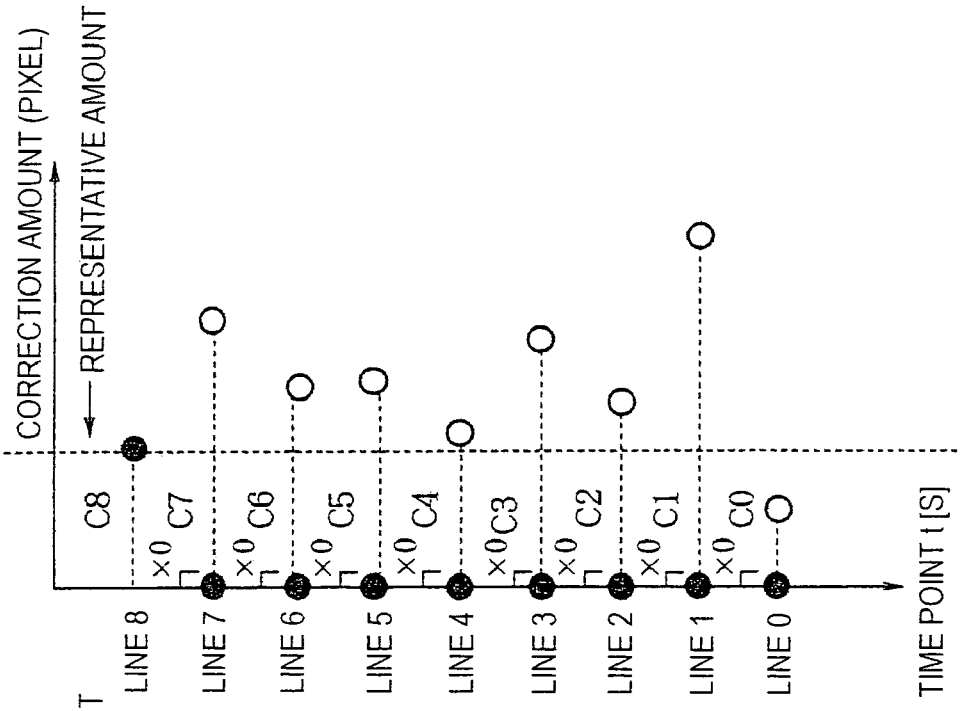
FIG. 8 is a view for explaining correction amounts and a coefficient.
Figure 8B:
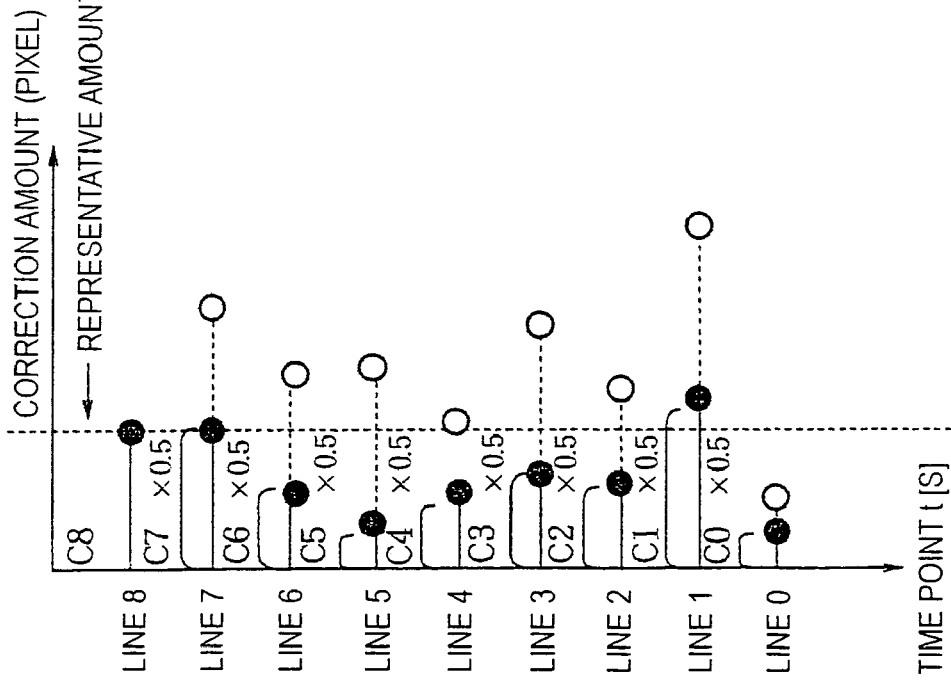

FIGS. 8A and 8B show correction amounts for the zoom magnification ratio higher than the first threshold value, (that is, the high magnification ratio) which are the same as those calculated in FIG. 7. FIG. 8A shows the correction amounts for the zoom magnification ratio between the first and second threshold values, and FIG. 8B shows the correction amounts for the zoom magnification ratio equal to or higher than the second threshold value.

As described above, in the high magnification ratio, the previously calculated correction amounts (hereinafter, referred to first correction amounts) are multiplied with the coefficient, so that the correction amounts (hereinafter, referred to as second correction amounts) to be actually used for the correction are calculated. In FIGS. 8A and 8B, white circles (circles not filled with color) denote the first correction amounts, and black circles (circles filled with color) denote the second correction amounts.

The second correction amounts shown in FIG. 8A correspond to the correction amounts multiplied with a coefficient of 0.5, and the second correction amounts shown in FIG. 8B correspond to the correction amounts multiplied with a coefficient of 0. In the figures, by comparing the white circles denoting the first correction amounts with the black circles denoting the second correction amounts, it can be understood that the correction amounts for the high magnification ratio is smaller than the correction amounts for the low magnification ratio. Namely, it can be understood from FIGS. 8A and 8B that the second correction amounts (black circles) used for the correction in the high magnification ratio is smaller than the first correction amounts (white circles) used for the correction in the low magnification ratio.

In addition, as shown in FIG. 8B, in a case where the coefficient of 0 is multiplied, the second correction amounts are calculated by multiplying the first correction amounts with the coefficient of 0. By multiplication of 0, the calculated values become 0. Therefore, at the time that the zoom magnification ratio is determined to be a magnification ratio where the coefficient of 0 is multiplied, the process for calculating the first or second correction amounts may be omitted.

For example, the order of the processes of Step S12, Step S13, and Step S14 in FIG. 3 may change. Firstly, the information on the zoom magnification ratio may be acquired. Next, when the zoom magnification ratio is determined to be a magnification ratio where the coefficient of 0 is multiplied (namely, when the zoom magnification ratio is determined to be equal to or higher than the second threshold value), the following processes (the processes for calculating the first and second correction amounts) may be omitted. However, in this case, since the representative amount is also required, the representative amount is calculated.

Since these processes can be used for the case where the coefficient of 0 is multiplied, the correction can be efficiently performed by suitably changing the order of the processes in the flowchart shown in FIG. 3, and the modification is within the scope of the present invention.

Although not shown, the process for calculating the second correction amounts such as a process for calculating the differences between the representative amount and the first correction amounts and calculating the second correction amounts by multiplying the differences with the coefficient may be suitably modified.

In addition, in the electronic zoom, as shown in the upper figures of FIG. 2, the number of lines constituting the one screen decreases according to the magnification ratio. When the magnification ratio changes in a direction for the high magnification ratio, the number of lines constituting the one screen which is actually displayed to the user decreases according to the magnification ratio. Therefore, in the high magnification ratio, the process may be performed for as many as the only number of lines that are displayed to the user. As a result, in the high magnification ratio, the capacity of the memory for storing the image data for the one screen can be reduced.

In addition, the data which are not stored in the memory are the data which may not be processed. Such data may not be stored in the memory, and the processes may not be performed on the data. For example, referring to the lower figures of FIG. 2 where the magnification ratio is ×16, the portions not indicated with hatching lines correspond to unnecessary data, and the processes may not be performed on the portions. As a result, the processes for the high magnification ratio can be reduced.

[Change in Point Number of Correction Amount According to Magnification Ratio]

Figure 9:
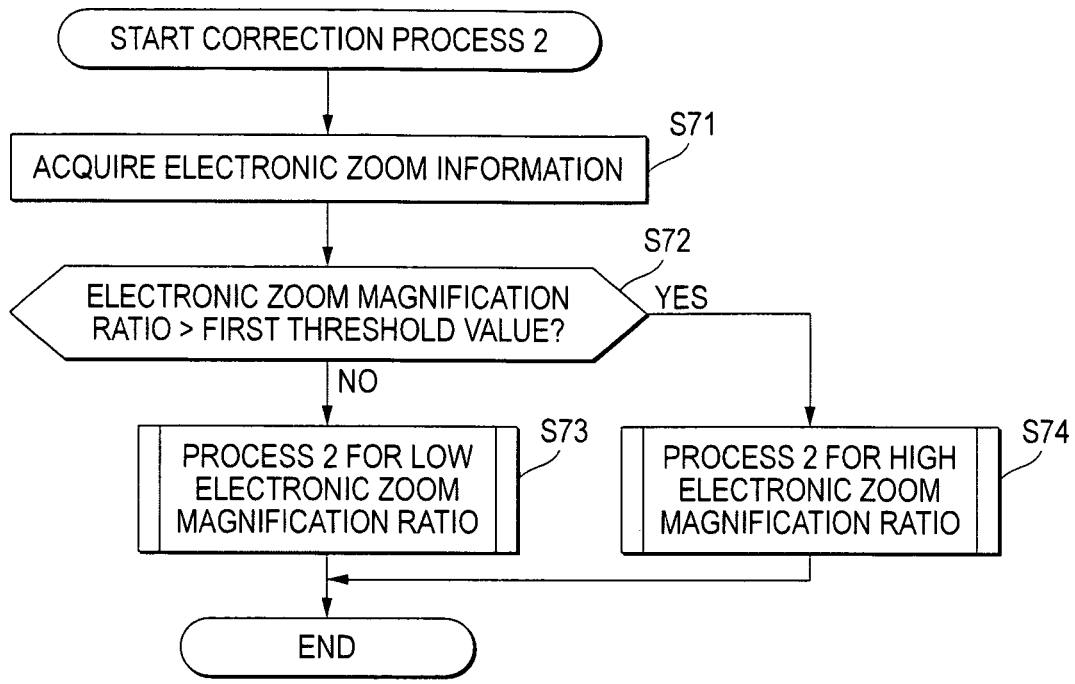
FIG. 9 is a flowchart for explaining other operations of an image processing apparatus.
Figure 10:
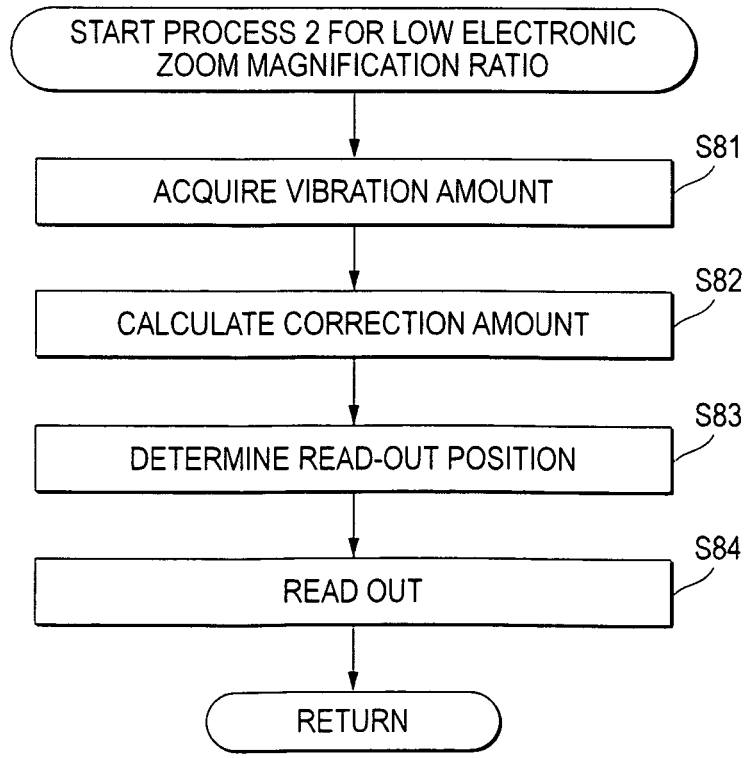
FIG. 10 is a flowchart for explaining other processes for a low magnification ratio.
Figure 11:
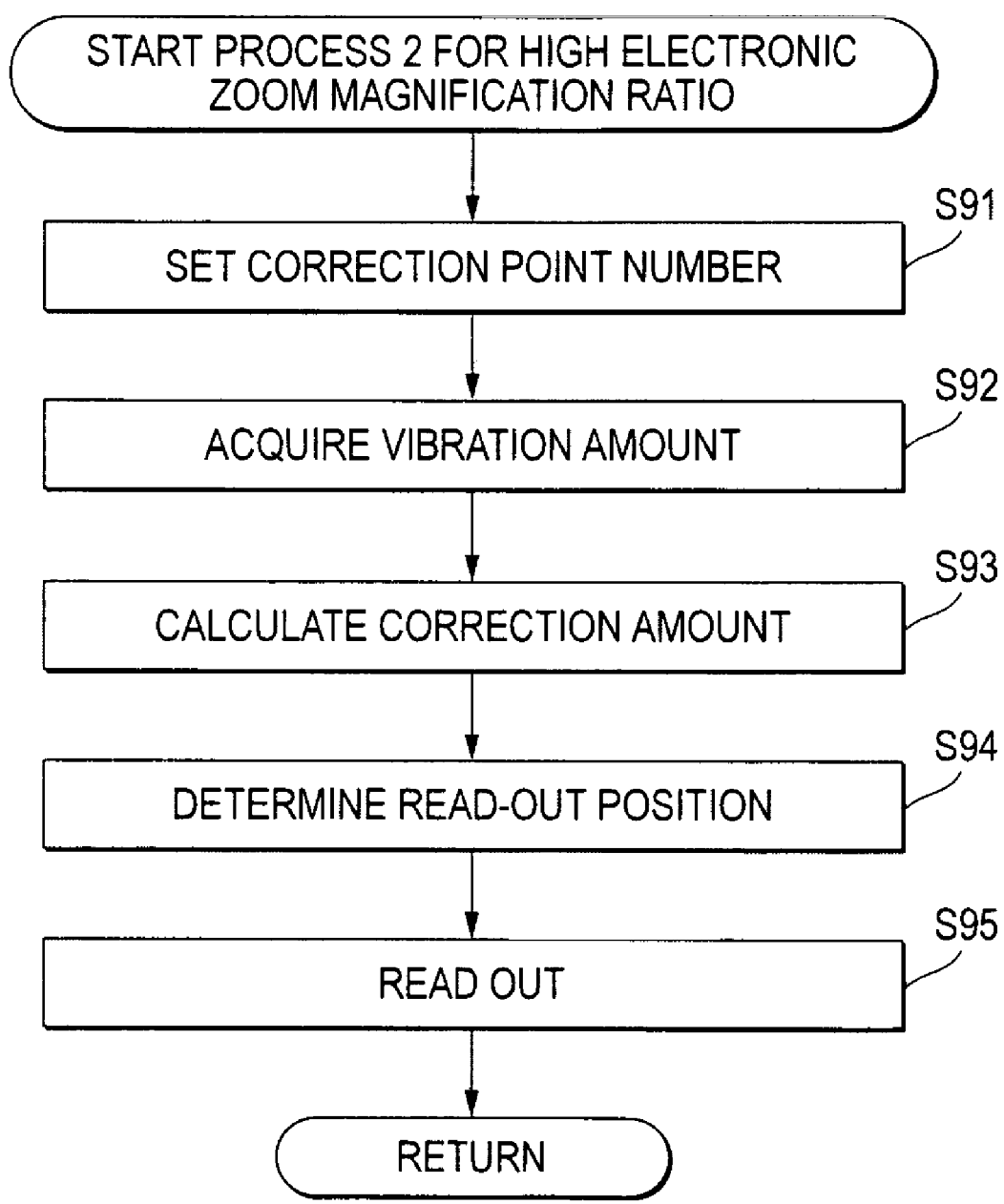
FIG. 11 is a flowchart for explaining other processes for a high magnification ratio.

Now, an embodiment of changing a point number of correction amount according to a magnification ratio in an electronic zoom will be described. A correction process in a case where the point number of the correction amount is changed will be described with reference to flowcharts of FIGS. 9 to 11. In the flowcharts of FIGS. 9 to 11, description of the same processes as those in the flowcharts of FIGS. 3 to 6 is omitted.

In Step S71, information on the magnification ratio of the electronic zoom is acquired. In Step S72, it is determined whether or not the magnification ratio of the electronic zoom indicated by the acquired information is equal to or higher than the first threshold value. If the magnification ratio is not determined to be equal to or higher than the first threshold value in Step S72, the process proceeds to Step S73, and a process for the low magnification ratio of the electronic zoom is performed. On the other hand, if the magnification ratio is determined to be equal to or higher than the first threshold value in Step S72, the process proceeds to Step S74, and a process for the high magnification ratio of the electronic zoom is performed.

The processes in Steps S71 to S74 are basically the same as those in Steps S13 to S16 in FIG. 3.

The process 2 for the low magnification ratio of the electronic zoom performed in Step S73 will be described with reference to the flowchart of FIG. 10. In Step S81, the vibration amounts are acquired, and in Step S82, the correction amounts are calculated from the vibration amounts. In Step S83, the read out positions are determined based on the calculated correction amounts, and in Step S84, the read out is performed at the determined read out positions.

The processes in Steps S81 and S82 are the same as those in Steps S11 and S12 of FIG. 3. The processes in Steps S83 and S84 are the same as those in Steps S31 and S32 of FIG. 4. Namely, in the low magnification ratio, the correction amounts for the lines constituting one screen are calculated from the acquired vibration amounts, and the data are read out based on the correction amounts. The processes may be the same as those in the optical zoom.

Next, Process 2 in the high magnification ratio of the electronic zoom performed in Step S74 (FIG. 9) will be described with reference to a flowchart of FIG. 11. In Step S91, a correction point number is set by the correction amount calculation unit 19. For example, in the low magnification ratio, when the one screen is constructed with 10 lines as described above, the correction amounts are calculated line-by-line, so that 10 correction amounts are calculated. On the other hand, in the high magnification ratio, the correction amounts for all the lines constituting the one screen are not calculated, but the correction in one screen is performed by using a smaller number of the correction amounts. This is will be described with reference to FIG. 12.

Figure 12:
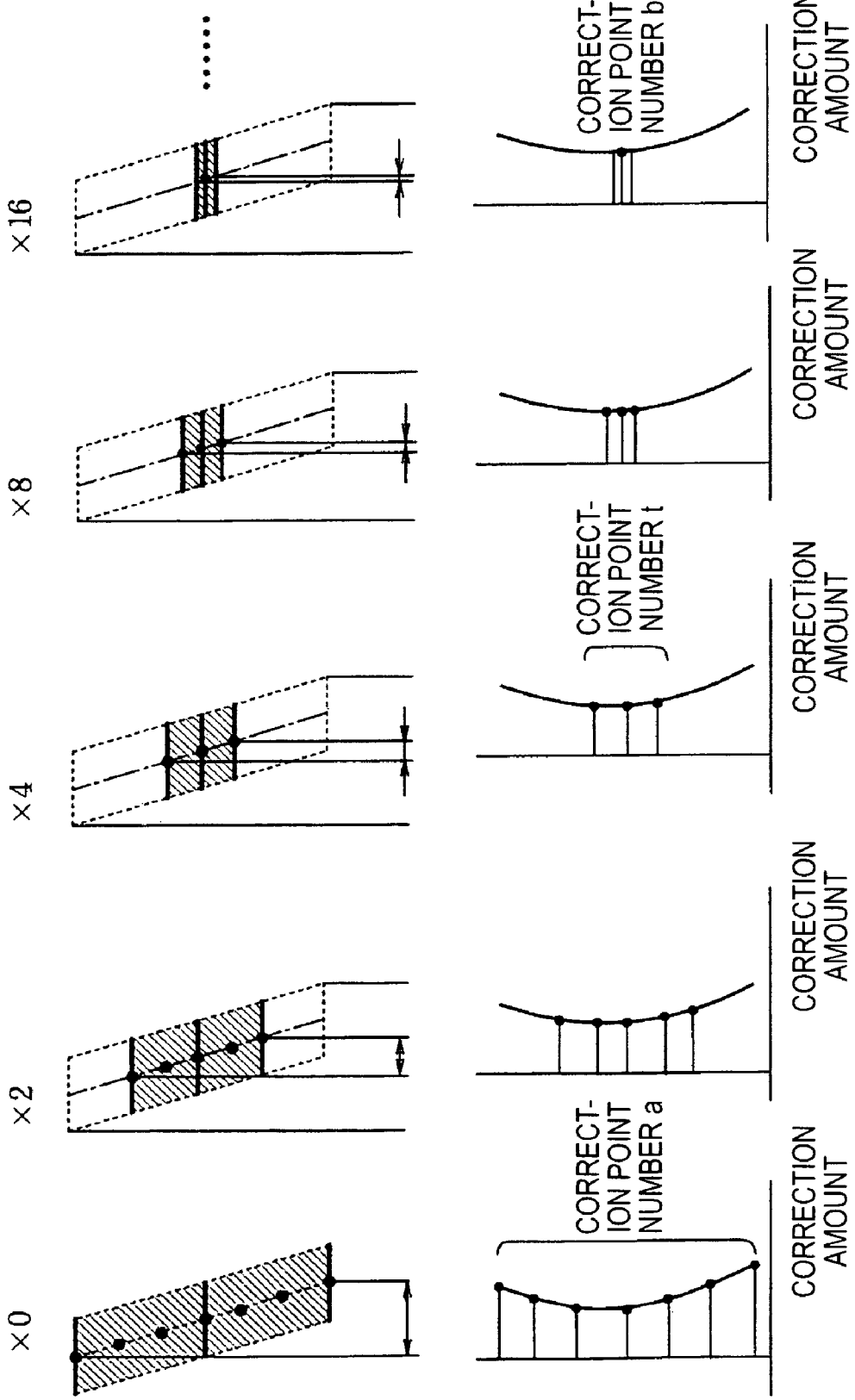
FIG. 12 is a view for explaining a correction point number.

When the magnification ratio is ×0, as shown in the upper and lower figures of FIG. 12, the correction amounts are calculated from 8 points (in this case, defined as a correction point number a). When the magnification ratio is ×2, as shown in the upper and lower figures of FIG. 12, the correction amounts are calculated from 6 points. When the magnification ratio is ×4, as shown in the upper and lower figures of FIG. 12, the correction amounts are calculated from 3 points. When the magnification ratio is ×8, as shown in the upper and lower figures of FIG. 12, the correction amounts are calculated from 3 points. When the magnification ratio is ×16, as shown in the upper and lower figures of FIG. 12, the correction amounts are calculated from one point (in this case, defined as a correction point number b).

Here, description of a case where a relation of (correction point number a)>(correction point number b) is satisfied is made. In addition, a correction point number which is smaller than the correction point number a and larger than the correction point number b is defined as a correction point number t, so that a relation of (correction point number a)>(correction point number t)>(correction point number b) is satisfied.

For example, if the correction point number is denoted by 3, three correction amounts are calculated from one screen. In this case, the correction is performed by using the correction amounts calculated from the vibration amounts acquired from a predetermined three lines among a plurality of the lines constituting the one screen. Alternatively, a plurality of the vibration amounts for a plurality of the lines constituting the one screen are acquired, and three correction amounts are calculated from a plurality of the vibration amounts.

In addition, the correction amounts corresponding to the number set as the correction point number are calculated from the one screen, and intervals between the calculated correction amounts are designed to be equivalent to each other as far as possible. For example, in a case where the correction point number is 3, the number of lines between the line where the first correction amount is calculated and the line where the second correction amount is calculated is set to be the same as the number of lines between the line where the second correction amount is calculated and the line where the third correction amount is calculated. Namely, the correction point number is set so as to allow the correction amounts to be calculated in an equivalent interval.

Figure 13:
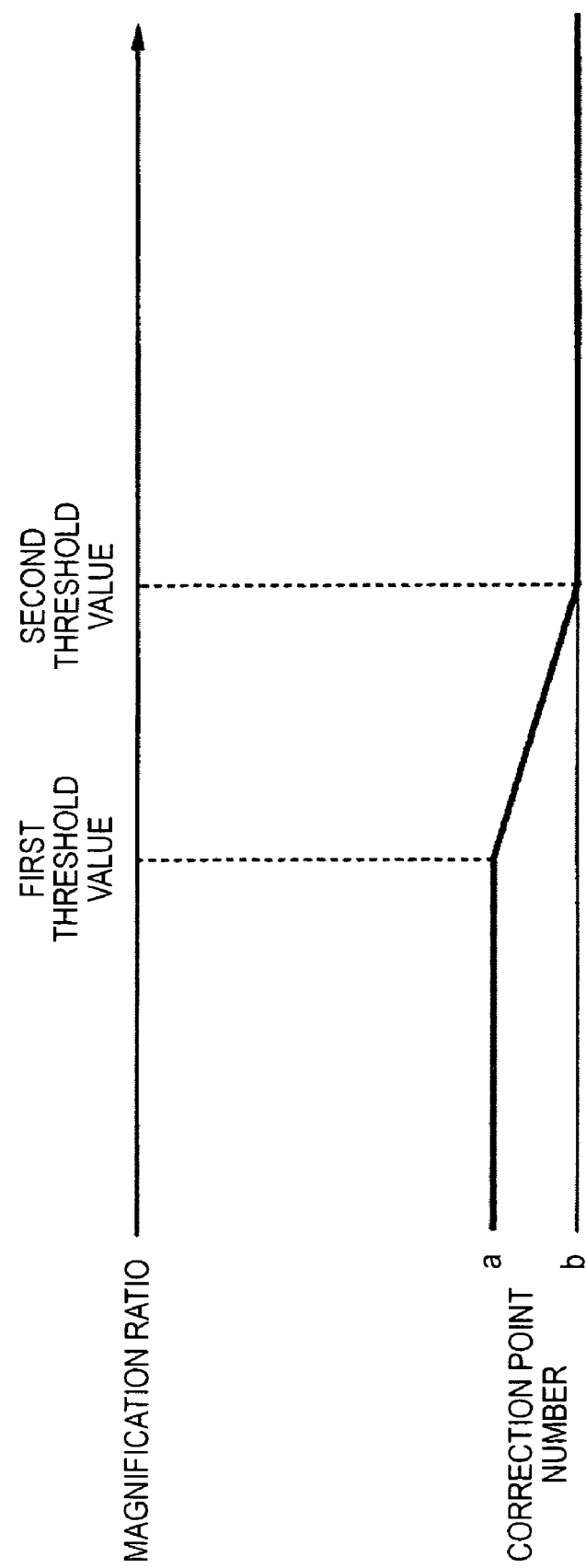
FIG. 13 is a view for explaining threshold values.

In this manner, the point number of the calculated correction amounts is set according to the magnification ratio of the electronic zoom. In Step S91 (FIG. 11), the process for setting the correction point number is performed. The setting of the correction point number will be described with reference to FIG. 13. The correction point number is determined according to the magnification ratio of the electronic zoom. FIG. 13 shows a relation between the magnification ratio and the correction point number. As described above, the first threshold value is a threshold value for identifying the low and high magnification ratios in Step S14 (FIG. 3). When the zoom magnification ratio is equal to or higher than the first threshold value, the process for the high magnification ratio is performed, and the correction point number is set. For example, the first threshold value may be set to ×2.

When the zoom magnification ratio is equal to or lower than the first threshold value, that is, when the zoom magnification ratio is the low magnification ratio, the correction point number is set to the correction point number a. The correction point number a may be set to the same number as the correction point number in a case where the magnification ratio of the electronic zoom is ×0. Namely, the correction point number a may be set to the number same as the correction point number when only the optical zoom is processed and as the number of lines constituting the one screen.

In addition, if the electronic zoom magnification ratio is equal to or lower than the first threshold value, since the processes (processes based on the flowchart of FIG. 10) for the low magnification ratio are performed, the processes same as those in the optical zoom are performed. Therefore, the correction point number a may be set to the number same as the point number of the correction amounts used for the optical zoom.

When the magnification ratio of the electronic zoom is a magnification ratio between the first and second threshold values, in the examples shown in FIG. 13, the correction point number t is determined (calculated) to be linearly proportional to the zoom magnification ratio.

When the zoom magnification ratio is equal to or higher than the second threshold value, the correction point number is set to the correction point number b. If the correction point number b is set to 0, there is no point where the correction amounts are calculated, so that the correction is not performed. In this case, the processes associated with the correction may be omitted. Namely, at the time that the magnification ratio is determined to be higher than the second threshold value, the following processes associated with the correction may be omitted.

The relation between the zoom magnification ratio and the correction point number shown in FIG. 13 is an example, and the present invention is not limited thereto. As an alternative method of calculating the correction point number, at the time that the zoom magnification ratio is higher than the first threshold value, the correction point number may be set to the correction point number b. In this case, the correction point number is the correction point number a or the correction point number b with reference to the first threshold value.

Alternatively, a table associated with the correction point number and the magnification ratio may be prepared, and the correction point number may be determined by referring to the table. When the magnification ratio is a value between the first and second threshold values, although the correction point number t is determined (calculated) to be linearly proportional to the zoom magnification ratio in the description with reference to FIG. 13, the table associated with the correction point number and the magnification ratio is maintained, so that the process for setting the correction point number may be omitted.

Returning to the description of the flowchart of FIG. 11, when the correction point number is set in Step S91, the vibration amounts are acquired in Step S92. The vibration amounts having the number (the number required for calculating the set number of the correction amounts) corresponding to the correction point number may be acquired. Such setting may be employed in a case where a sampling frequency indicating timings of acquiring the vibration amounts is changed according to the correction point number.

Alternatively, the vibration amounts may be acquired irrespective of the correction point number, and only the required vibration amounts may be selected from the acquired vibration amounts. Such setting may be employed in a case where the sampling frequency indicating the timings of acquiring the vibration amounts is set to be constant (a case where the sampling frequency is not changed according to the magnification ratio).

In a case where the number of the acquired correction amounts is associated with the correction point number, the process for acquiring the vibration amounts in Step S92 is performed after the process (Step S91) of setting the correction point number ends. However, in case where the number of the acquired correction amounts is not associated with the correction point number, the process for acquiring the vibration amounts in Step S92 is not necessarily performed after Step S91, and the order of processes may be suitably changed. In addition to Step S92, processes in several steps may be performed in a parallel manner, or the order of the processes may be suitable changed.

When the vibration amounts are acquired in Step S92, the correction amounts are calculated in Step S93. In Step S93, the correction amounts corresponding to the correction point number set in Step S91 are calculated. Next, in Step S94 and the following step thereof, the data are read out by using the calculated correction amounts. The processes in Steps S94 and S95 are basically the same as those in Steps S54 and S55 in FIG. 5.

As described above with reference to FIGS. 2 and 12, in comparison with the low magnification ratio, in the high magnification ratio, a time interval when the data constituting the one screen are acquired is short, so that the vibration amount is not easily accumulated. Therefore, the case of the high magnification ratio is not easily influenced by the vibration. Although the point number of the correction amounts for the high magnification ratio is set to be small, the correction can be suitably performed.

In addition, since the correction point number is set to be small, the processing load associated with the correction can be reduced. In addition, since the data associated with the correction can be reduced, the capacity of the memory required for the correction can be reduced.

In addition, since the number of lines constituting the one screen for the high magnification ratio is smaller than that for the low magnification ratio, if the number of the lines themselves may be provided to the image displayed to the user, the size of the image is reduced in comparison with the image for the low magnification ratio (see FIG. 2). In the high magnification ratio, in order to display the image having a size same as that of the image for the low magnification ratio to the user, a magnification process of the image for the high magnification ratio may be performed. Here, the detail description of the magnification process is omitted. By processing the data of one line into the data of several lines, the image having a small number of lines may be magnified to have a size same as that of the image for the low magnification ratio, so that the magnified image can be displayed to the user.

Since the processes which are not performed for the low magnification ratio are performed for the high magnification ratio, the processing load of the processes for the high magnification ratio increases in comparison with the processes for the low magnification ratio. However, as described above, in the high magnification ratio, since the processes associated with the correction can be reduced by reducing the correction point number, the processing load of the processes performed for the high magnification ratio can be reduced down to the processing load of the low magnification ratio or less.

[Change of Processed Section According to Magnification Ratio]

As described above, the number of lines constituting one screen in the high magnification ratio of the electronic zoom is small. Therefore, in the high magnification ratio, processed sections may be changed according to the magnification ratio. The processed sections will be described with reference to FIG. 14.

Figure 14A:
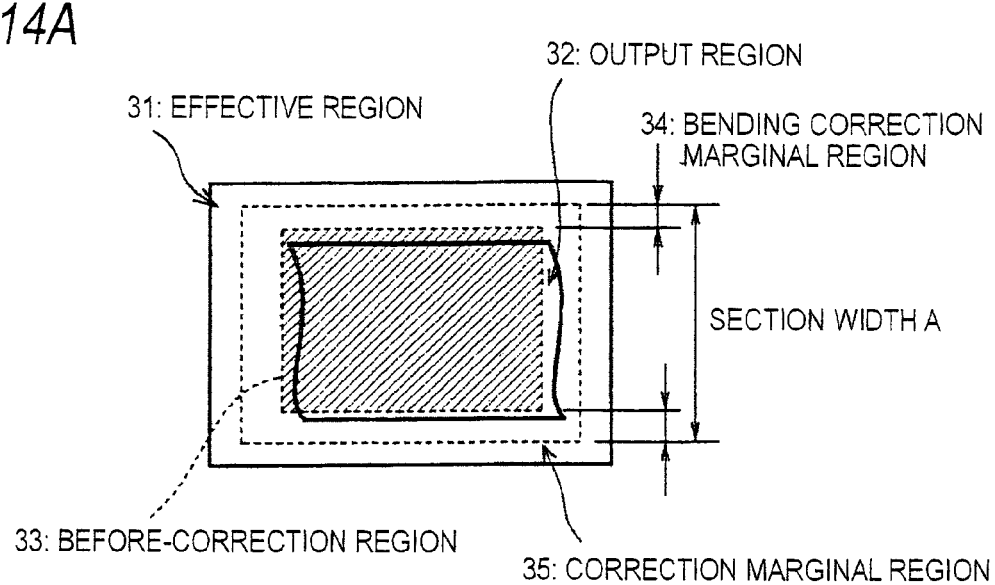
FIG. 14 is a view for explaining a processed section.
Figure 14B:
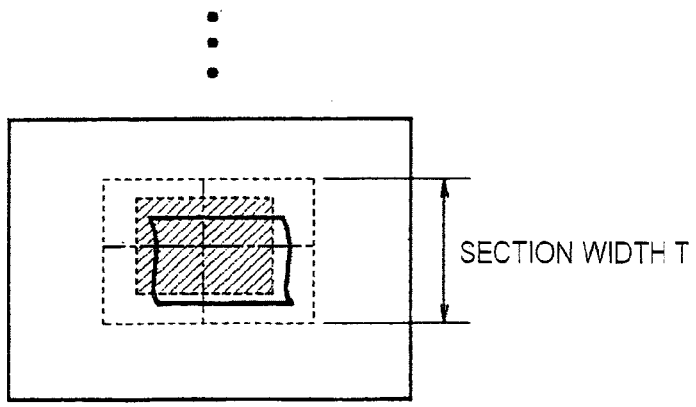
Figure 14C:
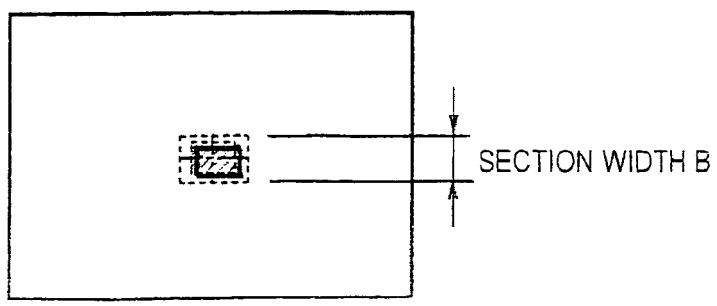

The image pickup device 11 (FIG. 1) picks up (shoot) an image of an object with an effective region 31 thereof as shown in FIG. 14A. An image within an output region 32 in the effective region 31 is displayed to the user. The output region 32 is an after-correction region where the aforementioned correction is performed as well as a region where the influence of the vibration amounts to the image is reduced.

The image in the output region 32 among the image in the effective region 31 is displayed to the user. In FIG. 14A, a before-correction region 33 indicated with hatching lines shows a region where a before-correction image exists. In order to generate the image in the output region 32, a region wider than the before-correction region 33 is to be processed. In FIG. 14A, a bending correction marginal region 34 is prepared as a marginal region used to correct bending (a kind of influence of the vibration) in upward and downward directions.

The bending correction marginal region is also prepared in leftward and rightward directions as well as the upward and downward directions. Therefore, the marginal region (a marginal region with respect to the output region 32) for correcting the bending or the like (bad influence of the vibration or the like) becomes the correction marginal region 35 as shown in FIG. 14A.

This will be described with respect to the low and high magnification ratios of the electronic zoom. In comparison of the output region 32 (before-correction region 33 in FIG. 14A) for the low magnification ratio with the output region 32 (before-correction region 33 in FIG. 14C) for the high magnification ratio, the output region 32 for the high magnification ratio is smaller than the output region 32 for the low magnification ratio. As described above, this is because the number of lines constituting one screen for the high magnification ratio is small for the electronic zoom.

Here, a processed section denotes a region including the output region 32 (before-correction region 33) and the correction marginal region 35. A size (length) of the processed section in the vertical direction (vertical direction of the figure) in FIG. 14A (low magnification ratio) is defined as a section width A. Although not shown (not defined), a section width, that is, a, horizontal width corresponding to the section width A may be also set.

Figure 15:
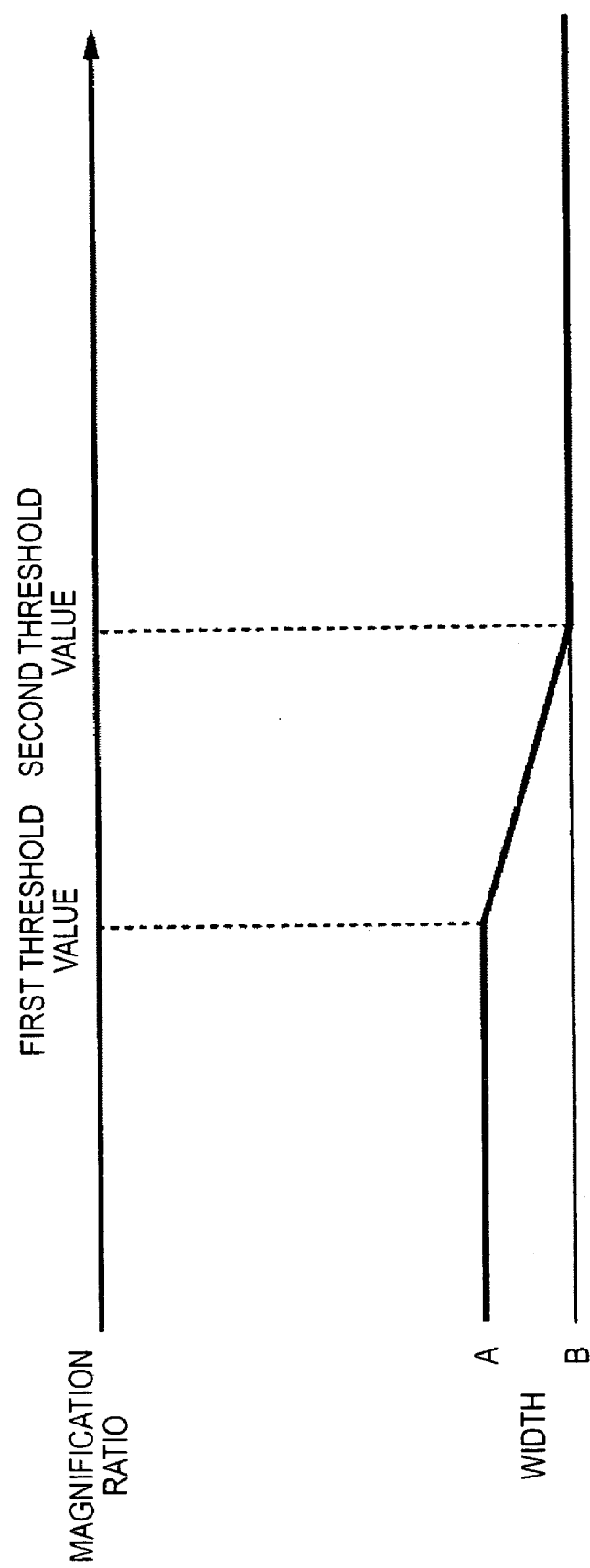
FIG. 15 is a view for explaining threshold values.

In the embodiment, the section width (processed section) is changed according to the magnification ratio of the electronic zoom. More specifically, as shown in FIG. 15, when the magnification ratio is equal to or lower than the first threshold value (the state shown in FIG. 14A), the processed section is set to the section width A, and an inner portion of the section is to be processed. When the magnification ratio is equal to or higher than the first threshold value and equal to or lower than the second threshold value (the state shown in FIG. 14B), the processed section is set to the section width T, and an inner portion of the section is to be processed.

When the magnification ratio is equal to or higher than the second threshold value (the state shown in FIG. 14C), the processed section is set to the section width B, and an inner portion of the section is to be processed. The section widths A, T, and B satisfy a relation of (section width A)>(section width T)>(section width B). In addition, the respective section widths are set in units of line (in units of pixel).

Figure 16:
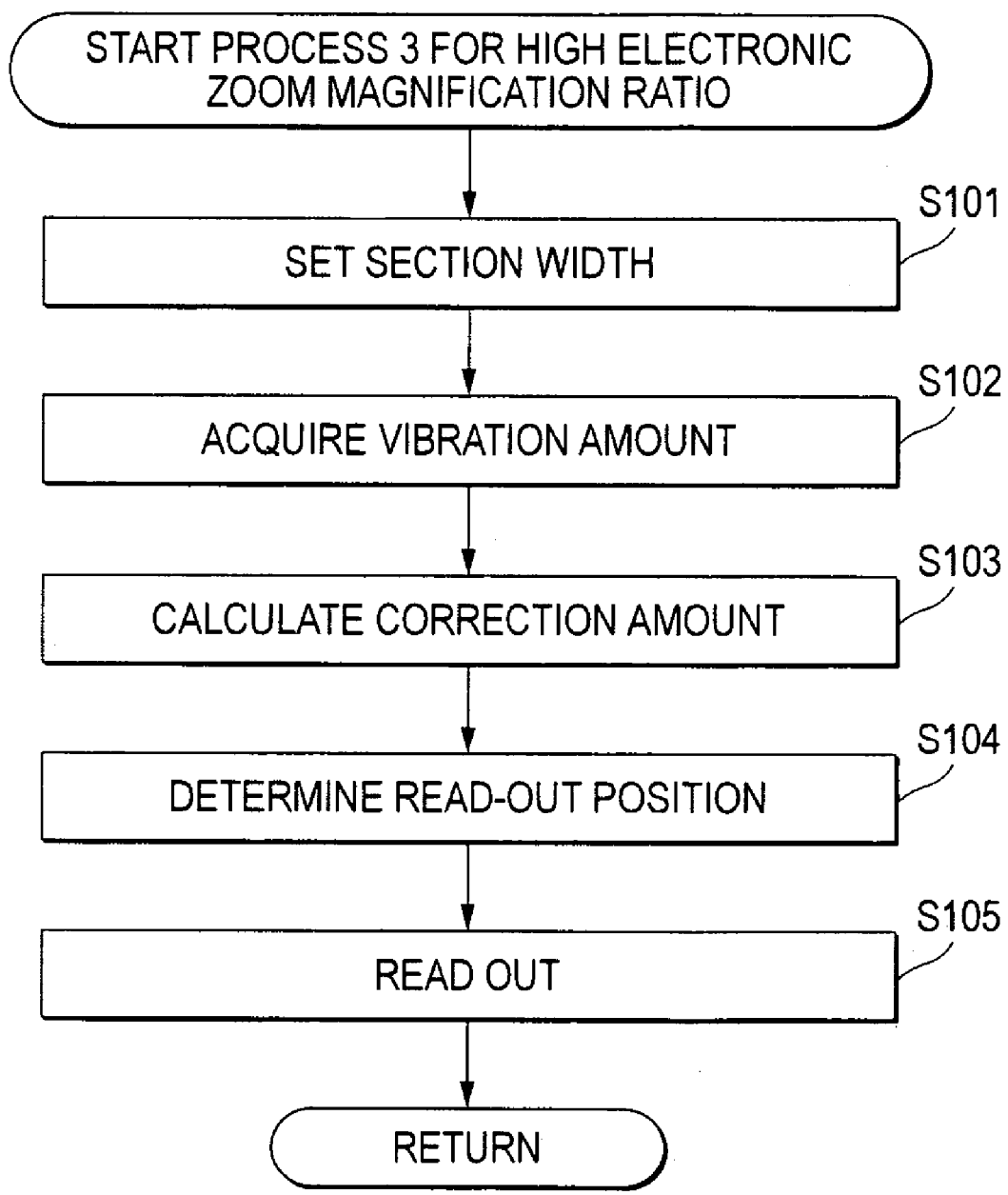
FIG. 16 is a flowchart for explaining other processes for a high magnification ratio.

In a case where the processed section is changed according to the magnification ratio, the whole processes associated with the correction are basically the same as the processes of the flowchart shown in FIG. 9. In addition, the processes for the low magnification ratio are basically the same as those of the flowchart shown in FIG. 10. Therefore, the description thereof is omitted, and different processes of the high magnification ratio are described with reference to a flowchart of FIG. 16. Here, the processes are described as Process 3 in the high magnification ratio of the electronic zoom.

In Step S101, the section width is set. The setting of the section width is performed in such a manner as described with reference to FIGS. 14 and 15. When the section width is set, processes are performed within the inner portion of the section width. Namely, in Step S102, the vibration amounts are acquired. With respect to the acquisition of the vibration amounts, similar to Step S92 of FIG. 11, in a case where the vibration amounts are acquired depending on the set section width (in a case where the vibration amounts are acquired only from the region within the set section width), the process thereof is performed after the process of Step S101. However, in a case where the vibration amounts are acquired irrespective of the set section width, the process thereof is not necessarily performed after the process of Step S101.

In Step S103, the correction amounts are calculated. In Step S103, only the necessary correction amounts are calculated within the set section width. In Step S104, the data read out position is determined by using the calculated correction amounts, and in Step S105, the data are read out from the determined data read out position.

Although only the processes associated with the correction such as the calculation of the correction amounts are exemplified, processes other than the processes associated with the correction may be performed only within the inner portion of the set processed section (with in the region). Therefore, by setting the processed section according to the magnification ratio, the processing load can be reduced.

In this manner, by setting the to-be-processed region (processed section) according to the magnification ratio, the following advantages can be expected. By limiting the processed section, the data not required for the processes may not be stored in a storage unit such as a memory, so that it is possible to reduce the capacity of the memory. In addition, by limiting the processed section, since the processes are performed within only the inner portion of the processed section, it is possible to reduce resources (for example, electric power or capacity of a storage unit (memory 17 in FIG. 1) for storing data required for the processes) required for the process such as a process for calculating the correction amounts.

In addition, by limiting the processed section, since the to-be-processed data amount are reduced, it is possible to reduce a driving frequency associated with the processes and processing resources.

In the aforementioned embodiments, the processes according to the magnification ratio of the electronic zoom are exemplified. However, the aforementioned embodiments may be employed, for example, in the optical zoom other than the electronic zoom.

In addition, in the aforementioned embodiments, the examples where the coefficients, the correction point number, or the processed section are set according to the zoom magnification ratio are separately described. However, a combination of the examples may be employed. For example, there may be an embodiment of setting the correction point number according to the zoom magnification ratio, calculating the correction amounts corresponding to the set correction point number, and multiplying the calculated correction amounts with the coefficient according to the zoom magnification ratio.

[Recording Medium]

A series of the aforementioned processes such as processes associated with the correction may be performed in a hardware manner having functions or in a software manner. In a case where a series of the processes are performed in a software manner, a program including the software may be installed from a recording medium in a computer assembled with dedicated hardware or a general purpose personal computer installing various programs to execute various functions.

Figure 17:
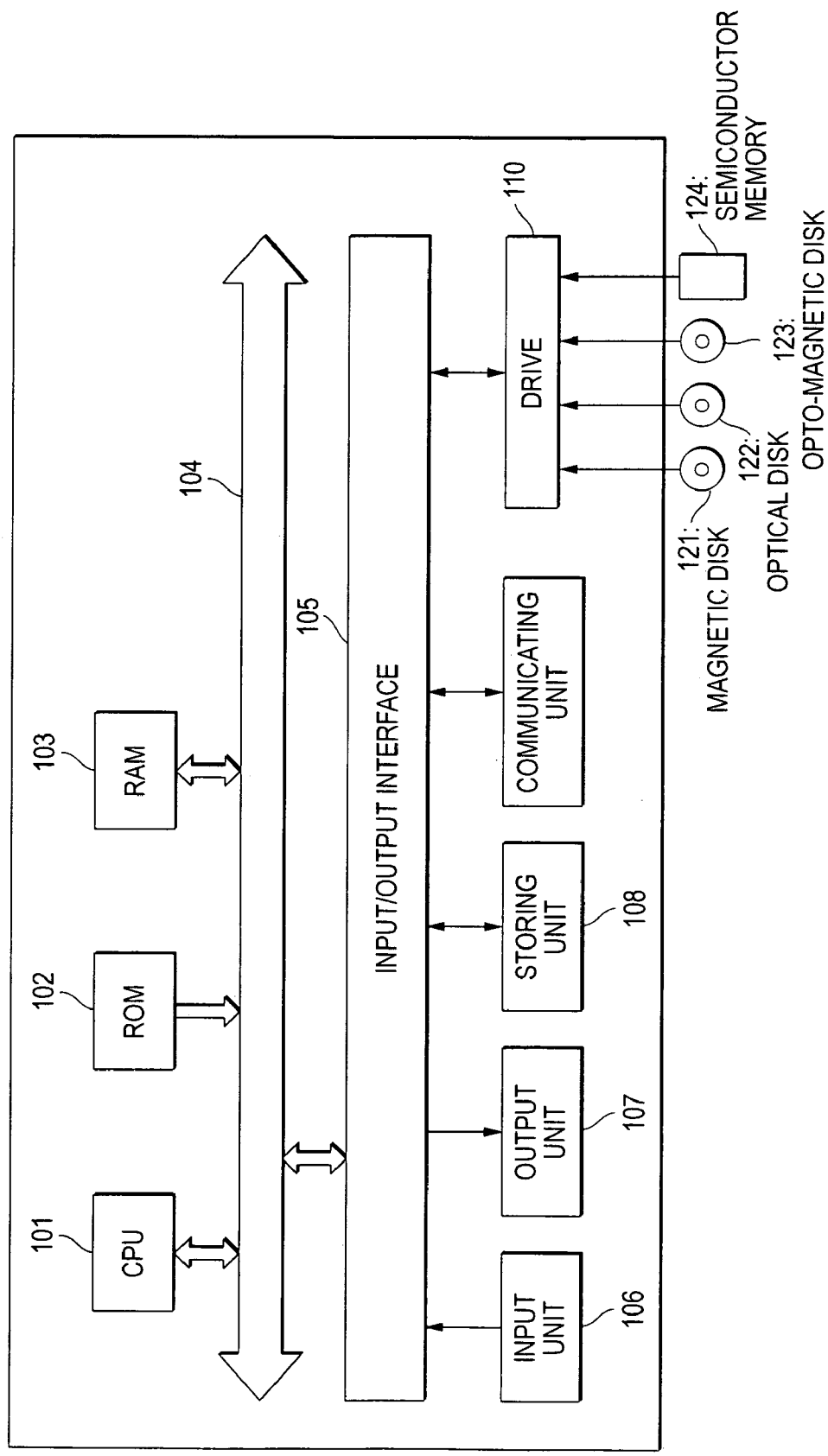
FIG. 17 is a view for explaining a recording medium.

FIG. 17 shows an example of a construction of the general purpose personal computer. A CPU (central processing unit) 101 of the personal computer executes various processes according to programs stored in a ROM (read only memory) 102. Data or programs required for executing various processes in the CPU 101 are stored in a RAM (random access memory) 103. An input/output interface 105 is connected to an input unit 106 including a keyboard or a mouse, and signals input to the input unit 106 are output to the CPU 101. In addition, an output unit 107 including a display or a speaker is connected to the input/output interface 105.

In addition, a storage unit 108 including a hard disk and a communication unit 109 for receiving and transmitting data with other apparatuses through a network such as the Internet are connected to the input/output interface 105. The drive 110 is used to read out or record data from or in a recording medium such as a magnetic disk 121, an optical disk 122, an opto-magnetic disk 123, and a semiconductor memory 124.

As shown in FIG. 17, the recording medium includes a package medium memory including a magnetic disk 121 (including a flexible disk), an optical disk 122 (including CD-ROM (compact disc-read only memory) and a DVD (digital versatile disc)), an opto-magnetic disk 123 (including a MD (mini-disc (registered trade mark)), and a semiconductor memory 124 where programs distributed to provide programs to users in separation from the personal computer is recorded or a hard disk including a ROM 102 or a storage unit 108 where programs provided to the users in a state where it is assembled in advance to the computer are stored.

In addition, in the specification, steps describing the programs provided by the recording medium includes processes which are executed in time sequential manner according to the described procedures or processes which are executed not in time sequential manner but in a parallel or individual manner.

In addition, in the specification, a system denotes a whole apparatus constructed with a plurality of apparatuses.

It should be understood by those skilled in the art that various modifications, combinations, sub-combinations and alternations may occur depending on design requirements and other factors insofar as they are within the scope of the appended claims or the equivalent thereof.

What is claimed is:

1. An image processing apparatus comprising:
   an image pickup unit picking up an image with an image pickup device;
   a vibration amount output unit detecting exerted vibration and outputting a vibration amount indicating a size of the vibration;

a calculation unit calculating at least one first correction amount for reducing influence of the vibration to the image from the vibration amount output by the vibration amount output unit;

a determination unit determining whether or not a zoom magnification ratio at a time that the image is picked up by the image pickup unit is equal to or higher than a predetermined threshold;

a generation unit generating a second correction amount based on the at least one first correction amount when the zoom magnification ratio is determined to be equal to or higher than the threshold value by the determination unit; and a correction unit correcting the image picked up by the image pickup unit based on the at least one first correction amount or the second correction amount.

2. The image processing apparatus according to claim 1, wherein the generation unit sets a coefficient corresponding to the zoom magnification ratio and generates the second correction amount by multiplying the at least one first correction amount with the coefficient.

3. The image processing apparatus according to claim 1, wherein the at least one first correction amount is a plurality of first correction amounts;

wherein the calculation unit calculates the plurality of the first correction amounts from the image, and wherein the generation unit sets a coefficient for plurality of the first correction amounts excluding at least a selected one first correction amount among the plurality of the first correction amounts.

4. The image processing apparatus according to claim 3, wherein the coefficient has a value of from 0 to 1.

5. The image processing apparatus according to claim 1, wherein the determination unit sets a coefficient corresponding to the zoom magnification ratio to 0 when the zoom magnification ratio is equal to or higher than a second threshold value which is larger than the predetermined threshold value.

6. An image processing method comprising:

an image pickup step of picking up an image by controlling an image pickup device;

a vibration amount output step of detecting exerted vibration and outputting a vibration amount indicating a size of the vibration;

a calculation step of calculating a first correction amount for reducing influence of the vibration to the image from the vibration amount output in the vibration amount output step;

a determination step of determining whether or not a zoom magnification ratio at a time that the image is picked up in the image pickup step is equal to or higher than a predetermined threshold;

a generation step of generating a second correction amount based on the first correction amount when the zoom magnification ratio is determined to be equal to or higher than the threshold value in the determination step; and a correction step of correcting the image picked up in the image pickup step based on the first correction amount or the second correction amount.

7. A computer readable medium tangibly embodying computer-executable instructions that when executed by a computer performs steps, the steps comprising:

an image pickup step of picking up an image by controlling an image pickup device;

a vibration amount output step of detecting exerted vibration and outputting a vibration amount indicating a size of the vibration;

a calculation step of calculating a first correction amount for reducing influence of the vibration to the image from the vibration amount output in the vibration amount output step;

a determination step of determining whether or not a zoom magnification ratio at a time that the image is picked up in the image pickup step is equal to or higher than a predetermined threshold;

a generation step of generating a second correction amount based on the first correction amount when the zoom magnification ratio is determined to be equal to or higher than the threshold value in the determination step; and a correction step of correcting the image picked up in the image pickup step based on the first correction amount or the second correction amount.

8. An image processing apparatus comprising:

an image pickup unit picking up an image with an image pickup device;

a vibration amount output unit detecting exerted vibration and outputting a vibration amount indicating a size of the vibration;

a setting unit setting a plurality of correction point numbers for reducing influence of the vibration to the image in one screen according to a zoom magnification ratio;

a calculation unit calculating correction amounts corresponding to respective ones of the plurality of correction point numbers set by the setting unit; and a correction unit correcting the image picked up by the image pickup unit based on the correction amounts calculated by the calculation unit.

9. The image processing apparatus according to claim 8, wherein when the zoom magnification ratio is equal to or higher than a predetermined threshold value at a time that the image is picked up by the image pickup unit, the setting unit sets the point number.

10. An image processing method comprising:

an image pickup step of picking up an image with an image pickup device;

a vibration amount output step of detecting exerted vibration and outputting a vibration amount indicating a size of the vibration;

a setting step of setting a plurality of correction point numbers of correction amounts for reducing influence of the vibration to the image in one screen according to a zoom magnification ratio;

a calculation step of calculating correction amounts corresponding to respective ones of the plurality of correction point numbers set in the setting step; and a correction step of correcting the image picked up by the image pickup step of based on the correction amounts calculated in the calculation step.

11. A computer readable medium tangibly embodying computer-executable instructions that when executed by a computer performs steps, the steps comprising:

an image pickup step of picking up an image with an image pickup device;

a vibration amount output step of detecting exerted vibration and outputting a vibration amount indicating a size of the vibration;

a setting step of setting a plurality of point numbers of correction amounts for reducing influence of the vibration to the image in one screen according to a zoom magnification ratio;

a calculation step of calculating correction amounts corresponding to respective ones of the plurality of correction point numbers set in the setting step; and a correction step of correcting the image picked up by the image pickup step of based on the correction amounts calculated in the calculation step.

12. An image processing apparatus comprising:
- an image pickup unit picking up an image with an image pickup device;
- a setting unit setting a to-be-processed region in the image picked up by the image pickup unit according to a zoom magnification ratio; and
- a processing unit processing only an inner portion of the region set by the setting unit.

13. The image processing apparatus according to claim 12, wherein when the zoom magnification ratio is equal to or higher than a predetermined threshold value at a time that the image is picked up by the image pickup unit, the setting unit sets the to-be-processed region.

14. The image processing apparatus according to claim 12, further comprising:
- a vibration amount output unit detecting exerted vibration and outputting a vibration amount indicating a size of the vibration; and
- a calculation unit calculating correction amounts for reducing influence of the vibration to the image from the vibration amount output by the vibration amount output unit, wherein the processing unit corrects the image picked up by the image pickup unit based on the correction amount.

15. An image processing method comprising:
- an image pickup step of picking up an image with an image pickup device;
- a setting step of setting a to-be-processed region in the image picked up in the image pickup step according to a magnification ratio; and
- a processing step of processing only an inner portion of the region set in the setting step.

16. A computer readable medium tangibly embodying computer-executable instructions that when executed by a computer performs steps, the steps comprising:
- an image pickup step of picking up an image with an image pickup device;
- a setting step of setting a to-be-processed region in the image picked up in the image pickup step according to a magnification ratio; and
- a processing step of processing only an inner portion of the region set in the setting step.

* * * * *